United States Patent
Jackson et al.

(10) Patent No.: US 10,776,384 B1
(45) Date of Patent: Sep. 15, 2020

(54) METHOD, SERVER AND SYSTEM FOR CRITERIA-BASED ASSURED REPLICATION

(71) Applicant: Ping Identity Corporation, Denver, CO (US)

(72) Inventors: Patrick Edward Jackson, Austin, TX (US); David Michael Ely, Austin, TX (US); Bjorn Aannestad, Austin, TX (US)

(73) Assignee: Ping Identity Corporation, Denver, CO (US)

( * ) Notice: Subject to any disclaimer, the term of this patent is extended or adjusted under 35 U.S.C. 154(b) by 369 days.

(21) Appl. No.: 14/265,247

(22) Filed: Apr. 29, 2014

Related U.S. Application Data

(60) Provisional application No. 61/817,579, filed on Apr. 30, 2013.

(51) Int. Cl.
*G06F 16/27* (2019.01)
*G06F 16/28* (2019.01)

(52) U.S. Cl.
CPC ............ *G06F 16/27* (2019.01); *G06F 16/282* (2019.01)

(58) Field of Classification Search
None
See application file for complete search history.

(56) References Cited

U.S. PATENT DOCUMENTS

| | | |
|---|---|---|
| 6,536,037 B1 | 3/2003 | Guheen et al. |
| 6,539,381 B1 | 3/2003 | Prasad et al. |
| 6,721,713 B1 | 4/2004 | Guheen et al. |
| 6,957,186 B1 | 10/2005 | Guheen et al. |
| 7,036,847 B2 | 4/2006 | Brown et al. |
| 7,315,826 B1 | 1/2008 | Guheen et al. |
| 7,340,447 B2 | 3/2008 | Ghatare |
| 7,509,310 B1 | 3/2009 | Joshi et al. |
| 7,627,658 B2 | 12/2009 | Levett et al. |
| 7,664,788 B2 | 2/2010 | Aust |
| 7,673,012 B2 | 3/2010 | Nakano et al. |
| 7,779,010 B2 | 8/2010 | McGarvey |
| 7,822,781 B2 | 10/2010 | Greene et al. |
| 7,860,864 B2 | 12/2010 | Bell et al. |
| 7,890,632 B2 | 2/2011 | Hazlewood et al. |
| 7,904,487 B2 | 3/2011 | Ghatare |
| 7,954,144 B1 | 5/2011 | Ebrahimi et al. |
| 8,112,661 B1 * | 2/2012 | La France ........... G06F 11/2069 714/42 |
| 8,433,771 B1 | 4/2013 | Ellsworth et al. |

(Continued)

OTHER PUBLICATIONS

File History for U.S. Appl. No. 13/326,163, filed Dec. 14, 2011, 579 pages.

(Continued)

*Primary Examiner* — Thu N Nguyen

(57) ABSTRACT

A method of replicating changes to a dataset includes receiving from a client a request for an operation on the dataset, dynamically selecting from a plurality of replication assurance policies a selected replication assurance policy for the operation, the selected replication assurance policy determining a selected assurance level, wherein the selection is based on at least one of an operation criteria or a connection criteria, submitting, to a first replica of the dataset, a command comprising the operation, and reporting to the client the result of the operation according to the selected assurance level.

33 Claims, 20 Drawing Sheets

(56) References Cited

U.S. PATENT DOCUMENTS

| | | | |
|---|---|---|---|
| 9,367,560 | B1 | 6/2016 | Ely et al. |
| 9,380,446 | B2* | 6/2016 | Zhou ................. H04W 8/02 |
| 9,959,286 | B1 | 5/2018 | Ely et al. |
| 2002/0055972 | A1* | 5/2002 | Weinman, Jr. ...... G06F 11/2058 |
| | | | 709/203 |
| 2002/0147611 | A1 | 10/2002 | Greene et al. |
| 2002/0161860 | A1 | 10/2002 | Godlin et al. |
| 2002/0173984 | A1 | 11/2002 | Robertson et al. |
| 2003/0018506 | A1* | 1/2003 | McLean ............ G06Q 10/0637 |
| | | | 705/7.37 |
| 2003/0050996 | A1 | 3/2003 | Yohe et al. |
| 2004/0225632 | A1 | 11/2004 | Benson et al. |
| 2005/0050104 | A1 | 3/2005 | Kadyk et al. |
| 2005/0216421 | A1 | 9/2005 | Barry et al. |
| 2006/0168118 | A1 | 7/2006 | Godlin et al. |
| 2006/0190616 | A1 | 8/2006 | Mayerhofer et al. |
| 2008/0168106 | A1 | 7/2008 | Freedman |
| 2008/0256020 | A1 | 10/2008 | Wakefield |
| 2008/0256082 | A1 | 10/2008 | Davies et al. |
| 2010/0145908 | A1 | 6/2010 | Freedman |
| 2010/0169392 | A1 | 7/2010 | Lev Ran et al. |
| 2010/0174690 | A1 | 7/2010 | Marcotte |
| 2011/0016087 | A1 | 1/2011 | Freedman |
| 2011/0252071 | A1 | 10/2011 | Cidon |
| 2011/0283019 | A1* | 11/2011 | Bennett .................. G06F 9/541 |
| | | | 709/246 |
| 2012/0265636 | A1 | 10/2012 | Nemoto et al. |
| 2012/0330887 | A1 | 12/2012 | Young et al. |
| 2013/0054518 | A1* | 2/2013 | Anglin ............. G06F 17/30575 |
| | | | 707/610 |
| 2013/0117400 | A1 | 5/2013 | An et al. |
| 2015/0113046 | A1* | 4/2015 | Rosberg ................. H04L 67/42 |
| | | | 709/203 |
| 2015/0215319 | A1* | 7/2015 | Koeten ................. H04L 63/10 |
| | | | 726/1 |

OTHER PUBLICATIONS

Office Action for U.S. Appl. No. 13/326,163, dated Oct. 26, 2015, 22 pages.
Office Action for U.S. Appl. No. 13/326,163, dated Feb. 11, 2015, 45 pages.
Office Action for U.S. Appl. No. 13/326,163, dated Sep. 5, 2013, 33 pages.
Office Action for U.S. Appl. No. 13/326,163, dated Jun. 11, 2014, 46 pages.
Office Action for U.S. Appl. No. 15/181,015, dated Nov. 17, 2017, 23 pages.
Office Action for U.S. Appl. No. 15/181,015, dated Mar. 9, 2017, 18 pages.
Bahloul, S. et al., LSC Project, Ldap Synchronization Connector, Powerpoint Presentation, LSC@2011.RMLL [online], Retrieved from the Internet: <URL: http://lsc-project.org>, Jul. 13, 2011, pp. 1-40.
Block Diagram, DL360-G6 [undated], 1 page.
Chu, H. Y., Change Sequence Numbers for LDAP, Symas Corporation, Internet Society, Internet Draft, <draft-chu-idap-csn-00.txt>, Dec. 1, 2004, 8 pages.
Donnelly, M., An Introduction to LDAP [online], Retrieved from the Internet: <URL: www.ldapman.org>, Apr. 28, 2000, 9 pages.
Good, G. et al., Definition of an Object Class to Hold LDAP Change Records, Change Record Object Class Definition, Internet Draft, <draft-good-ldap-chingelog-00.txt>, Mar. 11, 1998, Netscape Communications, 16 pages.
Good, G. et al., Definition of an Object Class to Hold LDAP Change Records, Internet Draft, <draft-good-ldap-changelog-04.txt>, Mar. 1, 2003, The Internet Society [online], Retrieved from the Internet: <URL: http://www.ietf.org/ietf/1id-abstracts.txt>, 10 pages.
Henry, G., OpenLDAP Replication Strategies, Suretec [online], Retrieved from the Internet: <URL: http://creativecommons.org. licenses/by/3.0>, Apr. 2, 2009, 33 pages.
Hewlett-Packard Development Company, L.P., HP ProLiant Intel-based 300-series G6 and G7 servers, Technology Brief, Apr. 2010, 24 pages.
Hewlett-Packard Development Company, L.P., QuickSpecs, HP Proliant BL490c Generation 6 (G6) Server Blade, DA 13236 Worldwide, Version 14, Jan. 10, 2011, pp. 1-34.
Intel Nehalem Based Systems with QPI, [undated], 8 pages.
Intel Corporation, Block Diagrams, Intel XEON 5500 Chipset [undated], 2 pages.
Langley, T. et al., Introduction to Intel Architecture, The Basics, Jan. 2009, Intel Corporation, 26 pages.
McLain, N., About NDS Objects, Developer Net University, Novell, Oct. 18, 2000, 4 pages.
Merrells, J. et al., LDAP Replication Architecture, Internet Draft, <draft-ietf-ldup-model-06.txt>, The Internet Society [online], Retrieved from the Internet: <URL: http://www.ietf.org/ietf/1id-abstracts.txt>, Mar. 2, 2000, 62 pages.
OpenLDAP Foundation, Replication with slurpd, Section 14, Admin Guide, 2008, 6 pages.
OpenLDAP Foundation, Replication, Section 16, Admin Guide 2.4, 2011, 11 pages.
OpenLDAP Foundation, Introduction to OpenLDAP Directory Services, Section 1, Admin Guide, 2011, 10 pages.
OpenLDAP Foundation, LDAP Sync Replication, Section 14, OpenLDAP Admin Guide 2.2, 2003, 6 pages.
OpenLDAP Foundation, LDAP Sync Replication, Section 15, Admin Guide, 2006, 6 pages.
OpenLDAP Foundation, The Proxy Cache Engine, Section 16, Admin Guide, 2008, 3 pages.
Oracle Corporation, Replication and the Retro Change Log Plug-In, Sun Directory Server Enterprise Edition 7.0 Reference, Part I Directory Server Reference, Chapter 7 Directory Server Replication, 2010, 4 pages.
Oracle Corporation, Replication and the Retro Change Log Plug-In, Sun Java System Directory Server Enterprise Edition 6.2 Reference, Part I Directory Server Reference, Chapter 4 Directory Server Replication, 2010, 4 pages.
Oracle Corporation, Replication Configurations, Sun Java System Directory Server Enterprise Edition 6.2 Reference, Part I Directory Server Reference, Chapter 4 Directory Server Replication, 2010, 6 pages.
Sun Microsystems, Inc., SunOpenDS Standard Edition 2.2 Administration Guide, Part No. 821-0506; Dec. 2009, 536 pages.
Srn Microsystems, Inc., Replicating Directory Data, SunOpenDS Standard Edition 2.2 Administration Guide, Part No. 821-0506, Dec. 2009, pp. 333-367.
UnboundID Corp., Class ChangeLogEntry, com.unboundid.ldap.sdk, 2011, 10 pages.
UnboundID Directory Proxy Server Product Description, Version 3.0, Jan. 5, 2011, 19 pages.
UnboundID Directory Proxy Server, Speedy, Scalable and Simple Proxy Solution [undated], Retrieved from the Internet: <URL: www.unboundid.com>, 2 pages.
UnboundID Directory Server Product Description, Version 3.0, Jan. 10, 2011, 22 pages.
UnboundID Directory Server, Next-Generation Directory Product [undated], Retrieved from the Internet: <URL:www.unboundid.com>, 2 pages.
UnboundID Synchronization Server, High-Performance, Low-Cost Data Synchronization [undated], Retrieved from the Internet: <URL: www.unboundid.com>, 2 pages.
UnboundID Synchronization Server Product Description, Version 3.1, Apr. 19, 2011, 18 pages.
Wikipedia, Lightweight Directory Access Protocol [online], Retrieved from the Internet: <URL: http://en.wikipedia.org/wiki/Lightweight_Directory_Access_Protocol>, Sep. 23, 2011, 12 pages.
Wikipedia, Lightweight Directory Access Protocol [online], Retrieved from the Internet: <URL: http://en.wikipedia.org/wiki/Lightweight_Directory_Access_Protocol>, Jul. 7, 2011, 12 pages.
Wikipedia, LDAP Data Interchange Format [online], Retrieved from the Internet: <URL: http://en.wikipedia.org/windex.php?>, Sep. 23, 2011, 4 pages.

(56) References Cited

OTHER PUBLICATIONS

Wikipedia, OpenLDAP [online], Retrieved from the Internet: <URL: http://en.wikipedia.org/wiki/OpenLDAP>, Jul. 24, 2011, 7 pages.

Zeilenga, K. et al., The Lightweight Directory Access Protocol (LDAP) Content Synchronization Operation, Network Working Group, Internet Society, Jun. 2006, 33 pages.

ZyTrax, Inc., Chapter 7 Replication & Referral [online], Retrieved from the Internet: <URL: www.zytrax.com>, Jul. 2011, 23 pages.

\* cited by examiner

```
$ bin/dsconfig create-request-criteria \
    --criteria-name Adds \
    --type simple \
    --set operation-type:add
```
← 900

FIG. 9

```
$ bin/dsconfig create-replication-assurance-policy
    --policy-name "Adds Processed All Locally" \
    --set evaluation-order-index:1 \
    --set local-level:processed-all-servers \
    --set "timeout:500ms" \
    --set request-criteria:Adds
```
← 1000

FIG. 10

```
$ bin/dsconfig create-request-criteria \
--criteria-name Mods \
--type simple \
--set operation-type:modify $ bin/dsconfig create-replication-assurance-policy \
--policy-name "Mods Received Any Locally" \
--set evaluation-order-index:2 \
--set local-level:received-any-server \
--set "timeout:500ms" \
--set request-criteria:Mods
```
← 1100

FIG. 11

```
$ bin/dsconfig create-request-criteria \
--criteria-name Adds \
--type simple \
--set operation-type:add $ bin/dsconfig create-request-criteria \
--criteria-name Mods \
--type simple \
--set operation-type:modify $ bin/dsconfig create-replication-assurance-policy \
--policy-name "Adds Received Any Locally" \
--set evaluation-order-index:1 \
--set local-level:received-any-server \
--set "timeout:500ms" \
--set request-criteria:Adds $ bin/dsconfig create-replication-assurance-policy \
--policy-name "Mods Processed All Locally" \
--set evaluation-order-index:2 \
--set local-level:processed-all-servers \
--set "timeout:500ms" \
--set request-criteria:Mods
```
← 1200

FIG. 12

```
$ bin/dsconfig list-replication-assurance-policies
Replication Assurance Policy        : Type    : enabled : evaluation-order-index : local-level              :remote-level
------------------------------------:---------:---------:------------------------:-------------------------:------------
Adds Processed All Locally          : generic : true    : 1                      : processed-all-servers    : none
Mods Received Any Locally           : generic : true    : 2                      : received-any-server      : none
Default Replication Assurance Policy: generic : true    : 9999                   : none                     : none
```

FIG. 13

```
$ bin/ldapsearch --baseDN "cn=Replica dc_example_dc_com,cn=monitor" \
    "(objectclass=*)" | grep replication-assurance replication-assurance-submitted-operations: 0
replication-assurance-completed-normally: 0
replication-assurance-completed-abnormally: 0
replication-assurance-completed-with-timeout: 0
replication-assurance-completed-with-shutdown: 0
replication-assurance-policy-matches: Adds Received Any Locally:0
replication-assurance-policy-matches: Default Replication Assurance Policy: 0
replication-assurance-policy-matches: Mods Processed All Locally: 0
```

FIG. 14

```
$ bin/ldapsearch --baseDN "cn=Replication Summary dc_example_dc_com,cn=monitor" \
    "(objectclass=*)" | grep replication-assurance replication-assurance-submitted-operations: 0
replication-assurance-local-completed-normally: 0
replication-assurance-local-completed-abnormally: 0
replication-assurance-local-completed-with-timeout: 0
replication-assurance-local-completed-with-shutdown: 0
replication-assurance-local-completed-with-unavailable-server: 0
replication-assurance-remote-completed-normally: 0
replication-assurance-remote-completed-abnormally: 0
replication-assurance-remote-completed-with-timeout: 0
replication-assurance-remote-completed-with-shutdown: 0 replication-assurance-remote-completed-with-unavailable-server: 0
```

FIG. 15

```
$ bin/ldapmodify --filename add-user.ldif --defaultAdd $ bin/ldapsearch --baseDN "cn=Replica dc_example_dc_com,cn=monitor" \
"(objectclass=*)" | grep replication-assurance replication-assurance-submitted-operations: 1
replication-assurance-completed-normally: 1
replication-assurance-completed-abnormally: 0
replication-assurance-completed-with-timeout: 0
replication-assurance-completed-with-shutdown: 0
replication-assurance-policy-matches: Adds Processed All Locally:1
replication-assurance-policy-matches: Default Replication Assurance Policy: 0
replication-assurance-policy-matches: Mods Received Any  Locally: 0
replication-assurance-local-level-uses: processed-all-servers: 1
replication-assurance-remote-level-uses: 1

$ bin/ldapsearch --baseDN "cn=Replication Summary dc_example_dc_com,cn=monitor" \
"(objectclass=*)" | grep replication-assurance replication-assurance-submitted-operations: 1
replication-assurance-local-completed-normally: 1
replication-assurance-local-completed-abnormally: 0
replication-assurance-local-completed-with-timeout: 0
replication-assurance-local-completed-with-shutdown: 0
replication-assurance-local-completed-with-unavailable-server: 0
replication-assurance-remote-completed-normally: 0
replication-assurance-remote-completed-abnormally: 0
replication-assurance-remote-completed-with-timeout: 0
replication-assurance-remote-completed-with-shutdown: 0
replication-assurance-remote-completed-with-unavailable-server: 0
```

FIG. 16

```
$ bin/ldapsearch --baseDN "cn=Replica dc_example_dc_com,cn=monitor" \
"(objectclass=*)" | grep replication-assurance replication-assurance-submitted-operations: 2
replication-assurance-completed-normally: 2
replication-assurance-completed-abnormally: 0
replication-assurance-completed-with-timeout: 0
replication-assurance-completed-with-shutdown: 0
replication-assurance-policy-matches: Adds Processed All Locally:1
replication-assurance-policy-matches: Default Replication Assurance Policy: 0
replication-assurance-policy-matches: Mods Received Any Locally: 1
replication-assurance-local-level-uses: processed-all-servers:1
replication-assurance-local-level-uses: received-any-server: 1
replication-assurance-remote-level-uses: none: 2

$ bin/ldapsearch --baseDN "cn=Replication Summary dc_example_dc_com,cn=monitor" \
"(objectclass=*)" | grep replication-assurance replication-assurance-submitted-operations: 2
replication-assurance-local-completed-normally: 2
replication-assurance-local-completed-abnormally: 0
replication-assurance-local-completed-with-timeout: 0
replication-assurance-local-completed-with-shutdown: 0
replication-assurance-local-completed-with-unavailable-server: 0
replication-assurance-remote-completed-normally: 0
replication-assurance-remote-completed-abnormally: 0
replication-assurance-remote-completed-with-timeout: 0
replication-assurance-remote-completed-with-shutdown: 0
replication-assurance-remote-completed-with-unavailable-server: 0
```

FIG. 17

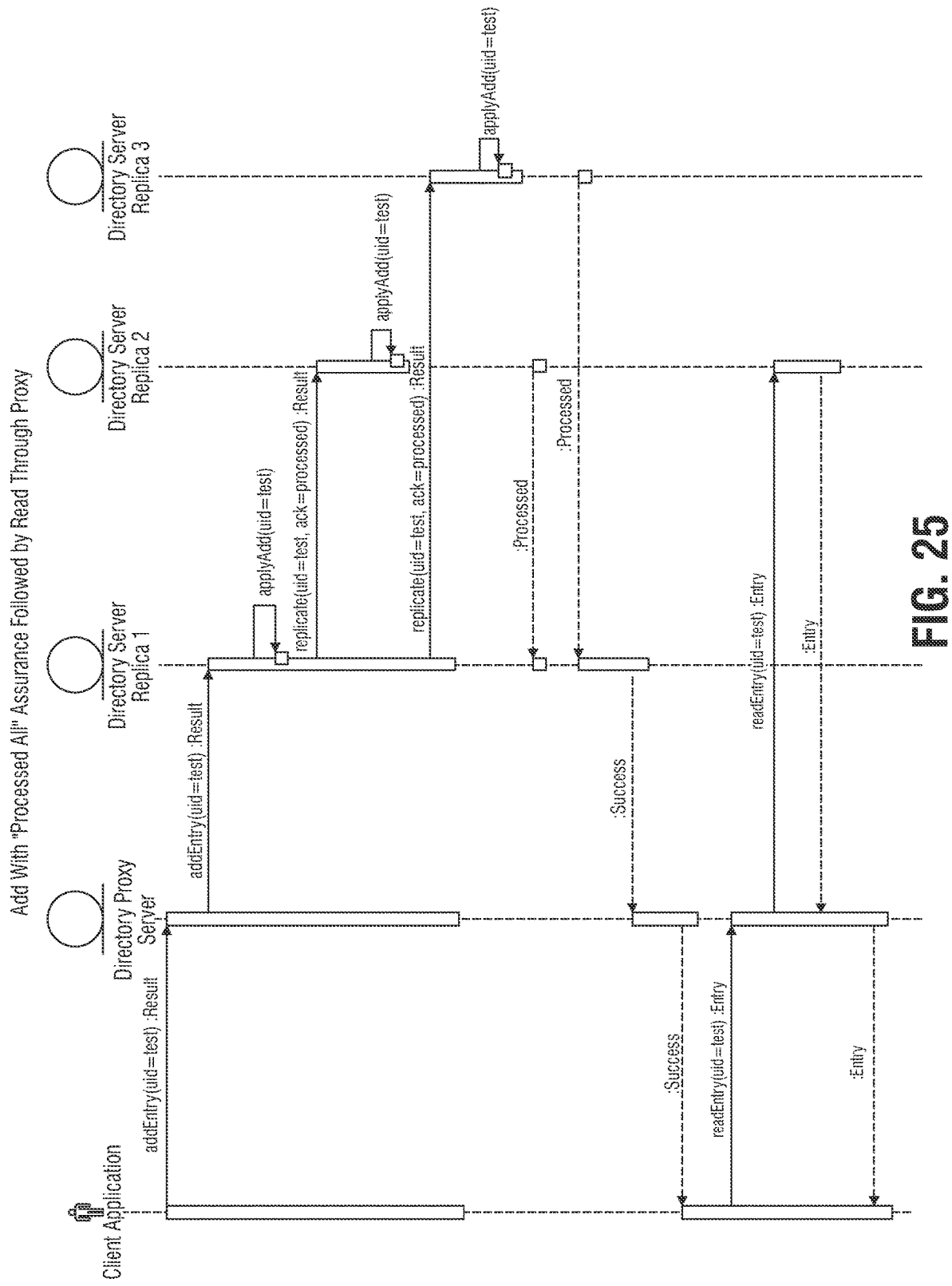

METHOD, SERVER AND SYSTEM FOR CRITERIA-BASED ASSURED REPLICATION

CROSS-REFERENCE TO RELATED APPLICATIONS

This application claims priority under 35 USC § 119(e) to U.S. Application Ser. No. 61/817,579 filed Apr. 30, 2013, which is incorporated herein by reference in its entirety.

FIELD OF THE INVENTION

Embodiments of the method, server and system claimed herein relate to the field of distributed database systems, including directory services and LDAP directories, and specifically to the field of replicating changes in a distributed database.

BACKGROUND

A distributed database is a database (or dataset) in which storage devices are not all attached to a common processing unit such as the CPU and is controlled by a distributed database management system (together sometimes called a distributed database system). Collections of data (i.e., in a distributed database or dataset) may be hosted on the same server, on multiple server computers located in the same physical location, or may be dispersed over a network of loosely coupled sites that share no physical components. A distributed database can reside on network servers on the Internet, on corporate internets or extranets, or on other company networks.

A directory service may embody a distributed database. A directory is a map between names and values. In a telephone directory, the nodes are names and the data items are telephone numbers. In a domain name server, the nodes are domain names and the data items are IP addresses (and aliases, mail server names, etc.). A directory server is a computer server system that stores, organizes and provides access to information in a directory. A directory service is the software system implemented on one or more computers, including directory servers. A directory service typically provides an organized set of records, such as a corporate email directory. A directory service may have a hierarchical data structure. LDAP, or Lightweight Directory Access Protocol, is an application protocol for maintaining distributed directory information services over an Internet Protocol (IP) network. Version 3 of the LDAP protocol (LDAPv3) was first published in 1997 and is in widespread use today.

An LDAP directory often is depicted as a tree, with the root node at the top. An entry is the basic unit of information in an LDAP directory. Each entry includes data for one or more attributes. Each entry has a unique name, the "distinguished name" or "DN." As between all child nodes of a single parent node, each sibling has a unique attribute, referred to as the RDN, or relative distinguished name, and the DN is the combination of all RDNs in the path from the entry to the root of the directory tree. To illustrate, take the directory entry: cn=john smith, ou=users, dc=example, dc=com. The DN for the entry is cn=john smith, ou=users, dc=example, dc=com, and the RDN is cn=john smith. For this entry, john smith is the data value for the attribute cn (common name), users is the data value for the ou attribute (organizational unit) on the parent entry of cn=john smith, and the data values on the parent entry for the attribute dc (domain component) are example and com.

A directory has a significant advantage over other database technologies in that it includes a flexible schema structure that is separate from the "access path" to the data. In other words, the directory information tree (DIT) structure of a directory is separate from the schema. This and other data model differences allow directories to optimize certain operations for speed (e.g., search operations) and outperform other database technologies, e.g., relational database management systems, for many kinds of problems.

Many distributed databases and directory servers support some form of replication whereby multiple servers contain identical copies of a dataset and changes to one are reflected in another. Replication involves sharing information so as to ensure consistency between redundant resources, such as software or hardware components, to improve reliability, fault-tolerance, or accessibility.

Replication offers several benefits, such as higher levels of availability where there are multiple servers with a copy of a dataset such that there is no single point of failure. Replication may also offer increased search performance by allowing read-only traffic such as search and authentication operations to be scaled horizontally. Also, replication reduces geographic latency such that replicas may be distributed geographically in multiple data centers. An application that needs access to the data may choose a replica that is in a data center closest to it, reducing the time it takes to access the data. A local replica could be located on one side of a slow network link, and installing a replica on the other side will improve response time for users on the other side of the link. If one directory server is in heavy use, or does not have enough CPU or memory power to handle all requests, some requests can be routed to a replica to reduce the load on the first server. Finally, replicas could be used for failover, meaning that if one server goes down, requests can be automatically rerouted to a replica to minimize disruptions in service.

In many directory service installations the directory contents may be stored on multiple systems. Indeed, a single directory may have multiple identical replicas, each of which can be independently modified. Replication in a directory service is a form of synchronization that is used to propagate changes from one directory server to all replicas of the same directory to ensure that each replica of a directory is, or will eventually be, identical.

However, because there are multiple copies of the data in a directory service, there is the opportunity that the data may become out-of-sync and a client may receive inconsistent results if it queries multiple replicas either directly or through a network load balancer or proxy. Likewise, if changes are replicated asynchronously (i.e., after a response is sent back to the client), the client could be notified of a successfully applied change, but that change might not be propagated to other servers in the topology (either temporarily or permanently).

DESCRIPTION OF THE DRAWINGS

FIGS. 9-17 illustrate exemplary commands used for configuring assured replication.

FIGS. 20-25 illustrate sequence diagrams of replication operations.

DETAILED DESCRIPTION

Figure 1A:
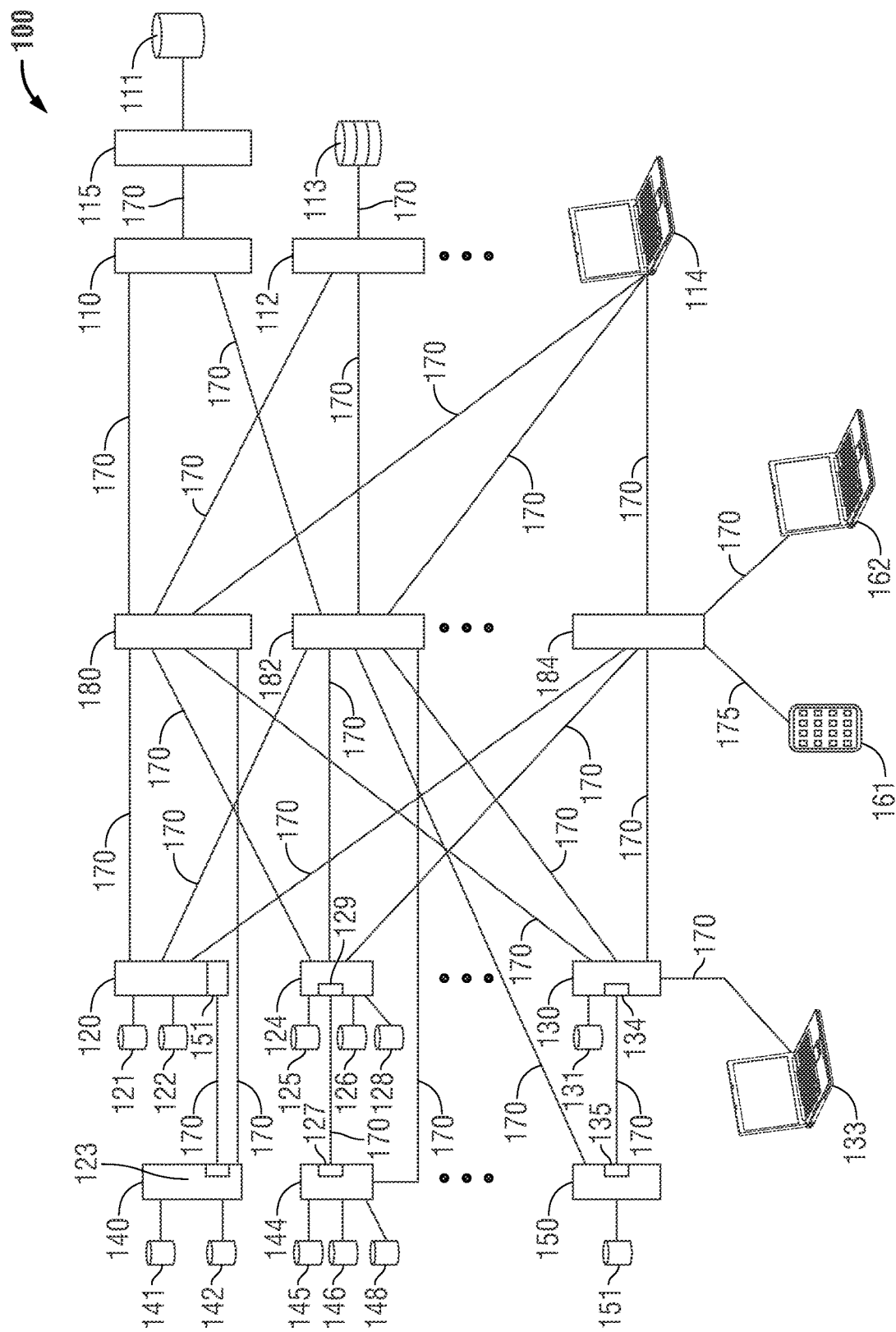
FIG. 1A is a top level block diagram of an exemplary embodiment of a directory service.

Embodiments of the methods, systems and servers described herein provide for dynamic selection of an assured replication policy.

Assured replication means that a server processing a change to a dataset with multiple replicas makes some additional assurance about the change being replicated beyond just replicating the change asynchronously to other servers. For example, an assured replication level of "processed all" implies that all servers (or at least those in a well-defined set, such as all servers in the local data center) have processed a change before returning the result to the client. As another example, an assured replication level of "received any" implies that at least one other server in the topology has acknowledged receipt of the change before the result is returned to the client.

There is a tradeoff between ensuring consistency among data and providing a low-latency response to clients. Vendors may take different approaches to address this. It is common for relational databases to take a synchronous approach to assured replication guaranteeing that the change has been applied everywhere before returning the result to the client (i.e., "processed all"). It is also typical for directory servers to offer multi-master replication with eventual consistency semantics, which means that multiple directories may be updated concurrently, and a replication protocol ensures that all servers converge to the same view of the data. However, replication in this case occurs asynchronously after the result has been sent to the client.

Alternatively, a global configuration option may be offered to control the replication assurance. In such a system, the administrator would choose for all updates coming into the directory whether (1) a result is immediately sent back to the client, and the change is replicated asynchronously, (2) the result is sent back to the client only after the update has been received by another replica, guaranteeing that it will propagate throughout the topology even if the replica processing the change becomes unavailable, or (3) the result is sent back to the client only after the update has been processed by all other replicas, guaranteeing that the client will see a consistent view of the data regardless of which server it queries for the data. The downside of this approach is that the policy is applied to all changes coming into the directory, forcing a least common denominator approach. In other words, if there is a single use case that requires an assurance level of "processed all," then all updates from all applications must use this level, which can significantly increase the latency of all operations.

Alternatively, another system might allow the application to choose the assurance policy that is used for each operation by allowing it to be included on an operation by operation basis (e.g. by using a request control in the case of LDAP). This puts all of the responsibility in the hands of the application. While it can be valuable for an application to have control over this, it is often difficult or infeasible to change the logic within an application. Likewise, this prevents the administrator from enforcing consistent policies across all applications. FIGS. 20-25 illustrate sequence diagrams of replication operations. What is needed, then, is the ability to dynamically select a replication assurance policy. An embodiment thereof is a criteria-based assured replication for a directory service which allows a replication assurance policy to be dynamically selected based on various criteria.

FIG. 1A depicts an exemplary directory service 100 comprising directory servers 120, 124, 130, 140, 144, and 150, synchronization servers (or sync servers) 110, 112, external LDAP client 114, and proxy servers 180, 182, 184.

Preferably, directory service 100 is an LDAP version 3 directory. The exemplary method, servers and systems described herein are not limited to LDAP directories, however. It is within the knowledge of those of ordinary skill in the art to extend the teachings herein to other distributed database systems, and other directory services, including but not limited to any directory that supports HTTP-based access over REST (Representational State Transfer) and SCIM (System for Cross-domain Identity Management).

Directory service 100 includes one or more means of accessing directories to read or update the directory, including, as depicted in FIG. 1, an external LDAP client hosted on computer 133 and connected to directory server 130 via link 170, a mobile application 161 connected to proxy server 184 via link 175, and an external LDAP client hosted on computer 162 and connected to proxy server 184 via link 170, and an external LDAP client 114. Preferably, a user or application can access a dataset in directory service 100 via any proxy server. In embodiments not shown, a proxy server will have connections to all directory servers in a topology.

A dataset may be replicated. In an embodiment, replication of a dataset means maintaining one or more exact copies (or replicas) of the dataset including, in embodiments, the same DIT structure, entries and attributes. A dataset preferably is replicated on a different directory server. In exemplary directory service 100, datasets 141 and 142, hosted on directory server 140, are duplicates of datasets 121 and 122, respectively, hosted on directory server 120; and datasets 145, 146 and 148, hosted on directory server 144, are duplicates of datasets 125, 126 and 128, respectively, hosted on directory server 124; and dataset 151, hosted on directory server 150, is a duplicate of dataset 131 hosted on directory server 130. Alternative embodiments may include multiple replicas for any dataset.

Figure 1B:
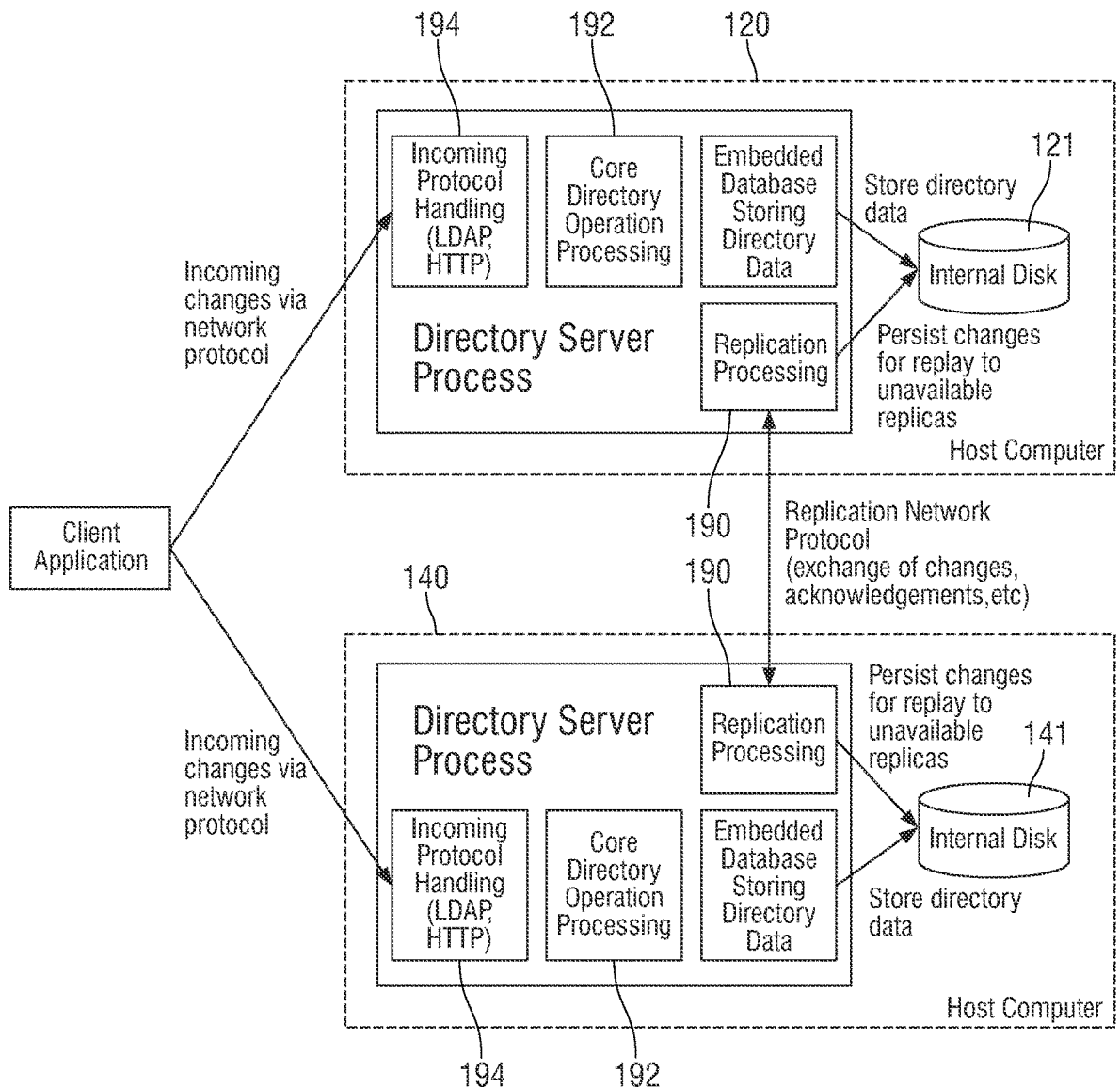
FIG. 1B is a top level diagram of an exemplary directory server architecture.

As shown in FIG. 1B, preferably a replication facility 190 is provided in each directory server 120, 140. In addition, core directory operation processors 192 and incoming protocol handlers 194 may be included in each directory server 120, 140. Embodiments of a replication facility include native replication ability in a directory server, a replication server co-resident in a directory server, an external replication facility, and other means known to those of ordinary skill in the art that enable directory servers to exchange details of changes via a communications protocol such as TCP/IP or another communications protocol available to one of skill in the art. The scope of the invention is not limited by the type of facility that is used to enable replication.

Referring to FIG. 1A, in an embodiment, directory server 120 includes replication facility 151 which communicates with replication facility 123 in replica directory server 140; directory server 124 includes replication facility 129 which communicates with replication facility 127 in replica directory server 144; and directory server 130 includes replication facility 134 which communicates with replication facility 135 in replica directory server 150.

It is possible that at an instant in time, two replicated directories, for example, 131 and 151, will not be exact replicas of each other. For example, if a change has been made to dataset 131 on directory server 130 via an external LDAP client hosted on client computer 133, there will be a time delay until that same change is propagated via replication facilities 134 and 135 to directory server 150 and applied to dataset 151. In ordinary operation this time delay often is slight. For some applications and some operations, the time delay may be negligible for practical purposes, so that, any user seeking to access directory server 130 or 150 could assume that the two directories are automatically and autonomously maintained as exact duplicates by the replication facilities. For other applications or operations, however, the time delay during which two replicated directories are not exactly identical may present serious operational issues.

The components of directory service 100 are interconnected by links 170. Link 170 includes any means of interconnecting computers known to those of skill in the art, including, by way of example, ethernet and other local area network (LAN) communications networks, the internet, World Wide Web, and other wide area network (WAN) communications networks. The communications protocol may include TCP/IP or any other communications protocol. In addition, mobile applications may interconnect to directory service 100 via communications link 175, which includes any form of interconnection included in links 170 and all forms of wireless or telecommunications networks. The scope of the invention is not limited by the nature of the network or by the means of interconnection between the various components of the directory service.

For purposes of illustration, exemplary directory service 100 is illustrated with six directory servers, three proxy servers, and three sync servers. However, the scope of the invention is not limited by the number of components nor is it limited to any specific topology.

In directory service 100, proxy servers 180, 182 and 184 act as intermediaries between directory servers 120, 124, 130, 140, 144, 150 and sync servers 110, 112. In an embodiment, each proxy server can be interconnected via link 170 with one, some or all of the directory servers in directory service 100. In alternative embodiments, changes to a dataset may be exposed by a proxy server directly connected to a user or application without a sync server.

In computer networks, a proxy server is a server (a computer system or an application) that acts as an intermediary for requests from clients seeking resources from other servers. A client connects to the proxy server, requesting some service, such as a file, connection, web page, or other resource, available from a different server. The proxy server evaluates the request according to its filtering rules. For example, it may filter traffic by IP address or protocol. If the request is validated by the filter, the proxy provides the resource by connecting to the relevant server and requesting the service on behalf of the client. A proxy may optionally alter the client's request or the server's response. Proxy servers 180, 182, and 184 preferably perform load balancing, failover, and data transformation.

In an embodiment, a sync server synchronizes the contents of a directory with another directory or data repository, such as a relational database management system (RDBMS). Synchronization includes making queries to detect changes to a sync source, e.g., a dataset hosted on a directory server, and based on the response, propagating the changes to a sync destination, e.g., a RDBMS. In exemplary directory service 100, sync server 110 synchronizes the directories with a directory server 115 hosting dataset 111, sync server 112 synchronizes the directories with external RDBMS 113, and external LDAP client 114 is hosted on an external computer. Sync servers 110, 112 may each act as a sync client and a sync source.

Assured Replication

Embodiments of the methods, systems and servers described herein provide for a directory service that allows one or more replication assurance policies to be dynamically selected based on various criteria associated with an assured replication operation. Assured replication may be supported by client requests through proxy servers and/or directly to directory servers. The type of assurance applied to each operation may be explicitly requested by the client and/or specified by server configuration. One or more embodiments disclosed herein may support different replication assurance levels. Embodiments disclosed herein refer to "local" and "remote" which are defined as follows. "Local" may mean in the same geographic or physical location, and "remote" may mean a different geographic or physical location. For example, in certain instances, remote servers may be separated by a Wide Area Network (WAN). Servers in the same location generally have a low latency network connection, and servers in different locations generally have a larger network delay.

In a first replication mode, the response to a client operation may be returned immediately after it completes on the local replica. Replication occurs in parallel to, or after, the response is sent to the client and no timing or success assurance is given.

In a second replication mode, the response to a client operation may be held until a configured number of directory servers acknowledge receipt of the operation, or until a timeout occurs. This acknowledgement may ensure that the operation has been received and queued for replay by the directory servers, however this acknowledgment may not ensure that the operation has been processed. The "assurance" being that the change will be propagated throughout the topology even if the originating server crashes immediately after the response was sent to the client. However, reads from the replicas may not be guaranteed to reflect the update immediately after the originating client receives a response.

In a third replication mode, the response to a client operation may be held until all replicas (either in the local data center or globally) have replayed the operation, or until a timeout occurs.

An assurance level used for each client may be determined by the server independently through replication assurance policies configured on the server and client request controls. Additionally, within these policies and controls the level a server uses for local and remote replicas may be configured independently. For example, a client may specify that replication to local servers (i.e., servers with the same geographic or physical location) be processed, while remote replications are received.

In certain embodiments, servers may be configured (at a global configuration level) with a default replication assurance policy and an optional list of replication assurance policies, with optional connection and/or request criteria configured, which is explained below in greater detail. In certain embodiments, each client operation may be associated with exactly one policy. When a client request comes in, the server iterates through the list of all the enabled policies based on the evaluation-order-index ordering of each policy, explained in greater detail below. The first policy that matches is associated with the operation. If no match is found, the default policy is associated.

The client may optionally include a request control with each operation that allows the client to specify bounds on the assurance levels and/or override the timeout assigned by the matching replication assurance policy for the associated operation. For clients that are allowed to use these controls, the server always honors these request controls even if it results in a lesser level of assurance that the server would have otherwise used. This allows an administrator to set up a default policy of assured, but an application that needed low response time and does not care about assurance may override such settings on a per-request basis. This is described in greater detail below with respect to replication assurance policies and replication request controls.

In certain embodiments, replication assurance policies may not be configured on proxy servers in the directory service.

Assured Replication Criteria

One or more request criteria may be used in assured replication operations to select one or more replication assurance policies in accordance with one or more embodiments disclosed herein. The one or more request criteria may be used to match assured replication operations with one or more assured replication policies. The one or more request criteria may include both or either connection criteria and operation criteria. One or more request criteria associated with an assured replication policy are evaluated for each operation. The one or more request criteria include details about the connection that is performing the operation as well as the operation itself.

Certain connection criteria may be used in accordance with one or more embodiments disclosed herein. In one instance, connection criteria may be determined by which server port receives a request. Using this connection criteria, the server may be configured with two (or more) TCP ports for incoming requests. One port provides no replication assurance while the second port has an assurance policy of "processed all." Applications that are sensitive to temporary replication delays may be configured to communicate with the "processed all" port, while all other applications may be configured to communicate with the main port. Changing the port that an application communicates with is much easier than updating it to request a specific assurance policy since no code change is needed.

In another instance, connection criteria may be determined by the identity of the user (or client) performing the change, either including or excluding said user. Using this connection criteria, if the default server replication assurance policy is not appropriate for a single application, then a dedicated replication assurance policy may be configured for it with a criteria that matches only the application as identified by the "user" (e.g., a bind DN in LDAP) that authenticated on the incoming connection. Alternatively, connection criteria may be determined by whether a client performing a change is in (or is not in) a specified user group. Using this as a connection criteria, multiple applications that require the same assured replication policy may be put into an LDAP group and criteria established that reference the group.

Still further, connection criteria may be determined by other client attributes, such as whether a user performing a change matches a specific search filter. Using this as connection criteria, the entry that represents the application user may include an attribute such as replication-assurance-level=none, and then criteria established that any operation performed by a user that matches (replication-assurance-level=none) will receive no replication assurance.

In other examples, connection criteria may be determined by the client's location. An exemplary location criteria is the IP address of the client, and an exemplary connection criteria could include a client IP address mask. It is sometimes not possible to identify an application by which user it uses to connect to the directory. Either, multiple applications share the same user account or because the application performs its operations on behalf of end users by using the end users' credentials. In this case, the connection criteria that is used to select the replication assurance policy for this application can identify the application by the IP addresses or IP address masks for the systems where the application is running Other connection criteria will be understood by one of ordinary skill in the art as being capable of matching assured replication operations with one or more assured replication policies.

Certain operation criteria may also be used in accordance with one or more embodiments disclosed herein. In one instance, operation criteria may be determined by an operation type used to perform a request. For example, using this operation criteria, all add operations must have an assurance policy of "processed all" to ensure that the entry can be found on all servers in the topology by the time the client receives a result.

In another instance, operation criteria may be determined by the type of an entry, and the type of entry can be targeted by a search filter. For example, using this operation criteria, entries of a specific type (as identified by an LDAP search filter) may receive a different replication assurance policy. Alternatively, operation criteria may be determined by the portion of the dataset affected by the operation. For example, in an LDAP directory, an entry may be targeted by base DN, such that different parts of the LDAP directory hierarchy may have different replication assurance policies. For instance, changes to privileged administrator accounts, which are located in a separate LDAP organizational unit, could receive a replication assurance policy of "processed all" to guarantee that they have been processed by all servers before returning. Operation criteria may also be determined by attributes included in a change, for example a password change. Accordingly, all changes to the password attribute may have an assurance policy of "processed all" to ensure that the user whose password was changed may authenticate against any server in the topology.

One of ordinary skill in the art will be familiar with additional connection and operation criteria that may be implemented in accordance with one or more embodiments disclosed herein. Further, the connection and operation criteria may be combined and nested with arbitrary Boolean logic of AND, OR, and NOT. For example, it would be possible to establish criteria that all password changes performed by administrators over a specific server port would have an assured replication policy of 'none.'

Figure 8:
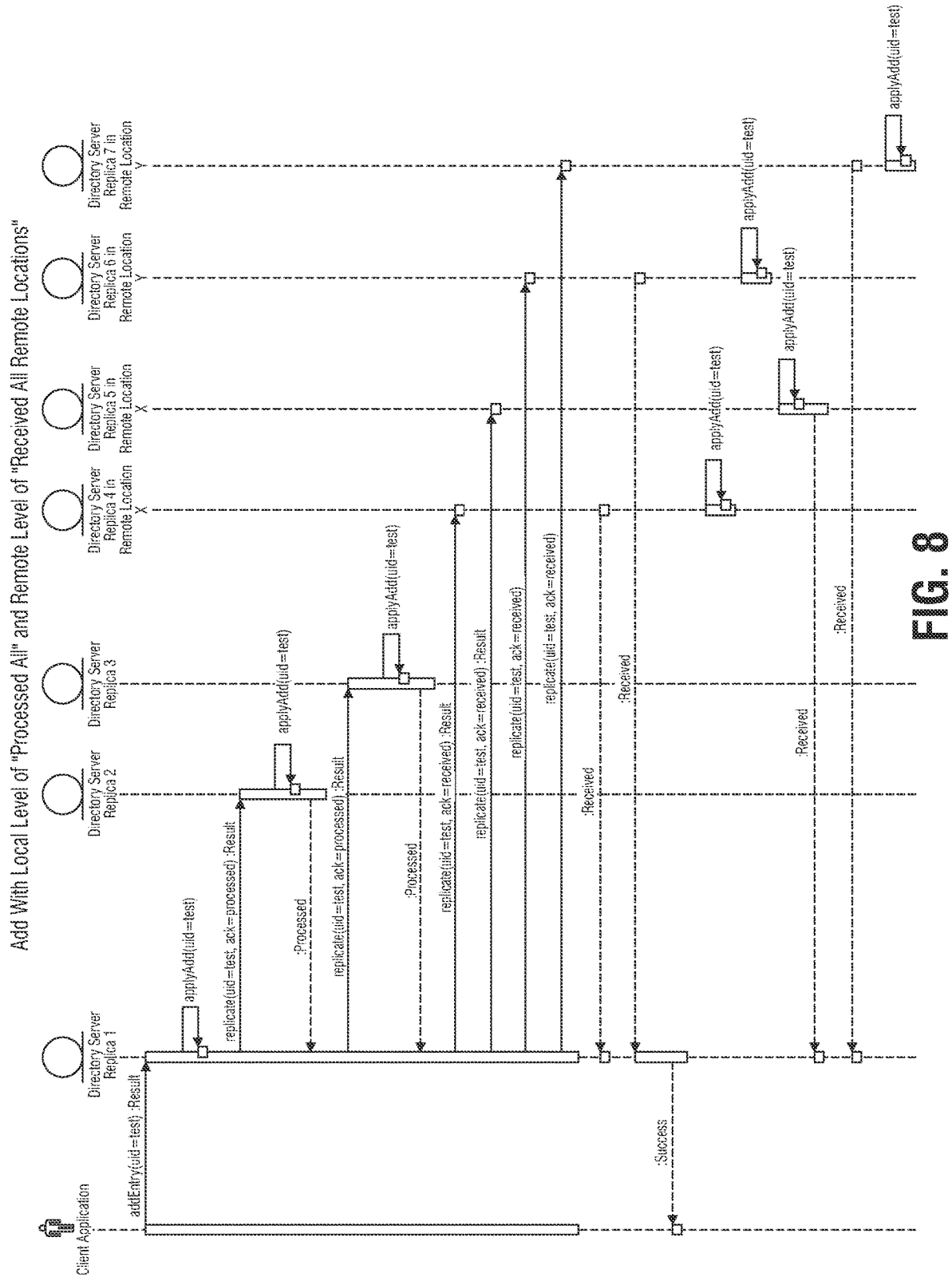
FIG. 8 is a sequence diagram of an exemplary operation having assured replication.

It's often desirable to have different replication assurance policies for servers in the same location (i.e., data center) and servers that are in a remote location. For instance, it may be preferable to have a policy of "processed all" for all servers in the same location as the server receiving the change, which guarantees that the client application will see all of its changes no matter what server it connects to, but a remote policy that just guarantees that the change has been received by each remote data center, which guarantees that the change will make it to all servers even if there is a network partition. The 'Add with Local Level of "Processed All" and Remote Level of "Received All Remote Locations"' sequence diagram illustrated in FIG. 8 shows an example of this.

Replication Assurance Policy

In accordance with one or more embodiments disclosed herein, assured replication uses one or more replication assurance policies to define the properties needed to ensure that replication has completed before the update response is returned to the client. These properties define the local and remote assurance levels (i.e., "levels" meaning that one or all servers must receive the replicated data before the response is returned) as well as the timeout interval for update operations, after which the response is sent to the client. Request criteria (either connection or operation criteria) may be associated with a replication assurance policy, so that incoming update requests can be matched to that specific replication assurance policy. Each operation request may be associated with exactly one replication assurance policy (e.g., add operations could have an "Adds Processed All Locally" policy, while modify operations could have a "Mods Received All Locally," etc.). The replication assurance policy may also ensure that if a client receives a response and the server on which the change was made subsequently becomes unavailable, the change is guaranteed to propagate to all local or remote servers. The update will survive and replicate to other servers, regardless of the originating server's failure.

The Directory Server may be configured with zero or one or more replication assurance policies. When a client request comes in, the server iterates through the list of enabled policies according to their evaluation-order-index property, which determines the order for finding a replication assurance policy match against an operation. A replication assurance policy with a smaller evaluation-order-index value (e.g., 1) has precedence over policies with larger evaluation-order-index values (e.g., 2, 3, and so on). For example, when a client add request comes in, the server evaluates the first policy to see if a match occurs and iterates through the other policies based on their respective evaluation-order-index property. The first policy that matches a request is associated with the operation. If no match is found, the default policy with no replication assurances is associated with the operation. It is noted that the evaluation-order-index property value must be unique but not necessarily contiguously ordered.

The one or more replication assurance policies in an embodiment may have the following properties:

evaluation-order-index. When multiple policies are defined, this property determines the evaluation order for finding a policy match among multiple replication assurance policies that match against an operation. Replication assurance policies are preferably evaluated based on this index from least to greatest. Values of this property must be unique but are not necessarily contiguous.

local-level. This is the assurance level used to replicate to local servers. A local server is defined as a server within the same data center as the server receiving the update. The local-level property in an embodiment must be set to an assurance level as strict as the remote-level property. For example, if the remote-level is set to "processed-all-remote-locations," then the local-level property must be "processed-all-servers."
  i. none. Replication to any local server is not assured.
  ii. received-any-server. At least one available local server must receive a replication update before a response is sent to the client.
  iii. processed-all-servers. All available local servers must complete replay of the replication update before the response is sent to the client.

remote-level. This is the assurance level used to replicate to remote servers. A remote server is defined as a server that is in a different data center as the server receiving the update.
  i. none. Replication to any remote server is not assured.
  ii. received-any-remote-location. At least one server at any available remote location must receive a replication update before a response is sent to the client.
  iii. received-all-remote-locations. At least one server in every available remote location must receive a replication update before a response is sent to the client.
  iv. processed-all-remote-servers. All available servers at all locations must complete replay of the replication update before the response is sent to the client.

timeout. Specifies the maximum length of time to wait for the replication assurance requirements to be met before timing out and replying to the client. In certain embodiments, the maximum length of wait time may be milliseconds to wait for the replication assurance requirements to be met before timing out and replying to the client. Regardless of assured replication timeouts, the result code sent to a client for a request preferably reflects the result as processed by the server that received the request. The timeout has no default setting and must be specified (unless both local and remote modes are 'none').

connection-criteria. Specifies the connection criteria used to indicate which operations from clients matching this criteria use this policy. Connection criteria match a replication assurance policy to operations based on information about the client connection such operations are received on, including client address, protocol, communication security, and authentication state and identity. If both the connection criteria and the request criteria are specified for a policy, then both must match an operation for the policy to be assigned.

request-criteria. Specifies the request criteria used to indicate which operations from clients matching this criteria use this policy. Request criteria match a replication assurance policy to operations based on the type of LDAP request being made by such operations (i.e., add, delete, modify, modify DN). If both the connection criteria and the request criteria are specified for a policy, then both must match an operation for the policy to be assigned.

Replication Assurance Request Controls

In certain embodiments, one or more replication assurance request controls may be provided with each operation, which allows the client to specify bounds on the assurance levels and/or override the timeout assigned by the matching replication assurance policy for the associated operation. For clients that are allowed to use these controls, the server always honors these request controls even if it results in a lesser level of assurance than the server would have otherwise used. The replication assurance request control has the following properties. All of the properties are optional in a request, but at least one must be included.

local-level-minimum={none, received-any-server, processed-all-servers} The minimum level of assurance the client requests, where: none<received-any-server<processed-all-servers. (default=none)

local-level-maximum={none, received-any-server, processed-all-servers} The maximum level of local assurance the client requests, where: none<received-any-server<processed-all-servers. This allows a client with lower latency requirements to request an appropriate assurance level. (default=processed-all-servers)

remote-level-minimum={none, received-any-remote-location, received-all-remote-locations, processed-all-remote-servers} The minimum level of assurance the client requests, where: none<received-any-remote-location<received-all-remote-locations<processed-all-remote-servers. (default=none)

remote-level-maximum={none, received-any-remote-location, received-all-remote-locations, processed-all-remote-servers} The maximum level of remote assurance the client requests, where: none<received-any-remote-location<received-all-remote-locations<processed-all-remote-servers. This allows a client with lower latency requirements to request an appropriate assurance level. (default=processed-all-remote-servers)

timeout (see timeout described above in accordance with replication assurance policies).

Replication Assurance Response Controls

One or more replication assurance response controls may be attached to all responses to client requests that are received with one or more replication assurance request controls. It may also be desirable to allow the client to indicate that the server should return these controls automatically without the need to include a request control with every operation (e.g., the client could request this when binding to the directory). The replication assurance response control has the following properties. All of the properties are optional in a response, but at least one must be included.

local-level={none, received-any-server, processed-all-servers} The local assurance level used for the operation (i.e., after updating with request control).

local-result={success, timeout, conflict, no-servers}
  i. success—The request met local assurance requirements.
  ii. timeout—The request timed out waiting for local assurance requirements to be met.
  iii. conflict—The request had a conflict on at least one local server required to meet assurance requirements.
  iv. no-servers—There are no available local servers to replicate to.

remote-level={none, received-any-remote-location, received-all-remote-locations, processed-all-remote-servers} The remote assurance level used for the operation (i.e., after conflict resolution).

remote-result={success, timeout, conflict, no-servers}
  v. success—The request met local assurance requirements.
  vi. timeout—The request timed out waiting for local assurance requirements to be met.
  vii. conflict—The request had a conflict on at least one local server required to meet assurance requirements.
  viii. no-servers—There are no available local servers to replicate to.

Failure Handling

A request failure means the request failed on the server that received the request and no replication occurs. This may be handled by sending the appropriate error result code back to the client.

A replication assurance timeout means the operation completed successfully on the server that received the request but timed out waiting to meet the assurance requirements. This may be handled by generating a result code with the server that received the request and sending back to the client after the timeout expires. If the client includes a replication assurance request control, the corresponding response control will provide more details about the replicated state at the time the response was created. It may also be desirable to allow the client to indicate that the server should return these controls automatically without the need to include a request control with every operation (e.g., the client could request this when binding to the directory).

A replication failure means the operation is completed successfully on the server that received the request, but a conflict occurred with at least one replica that was required to meet the specified assurance level. This may be handled in a manner similar to replication assurance timeouts.

Absence of a replication failure means the operation completed successfully on the server that received the request, but there were no available servers to meet the replication requirements. This may be handled in a manner similar to replication assurance timeouts.

Operation Processing

Figure 2:
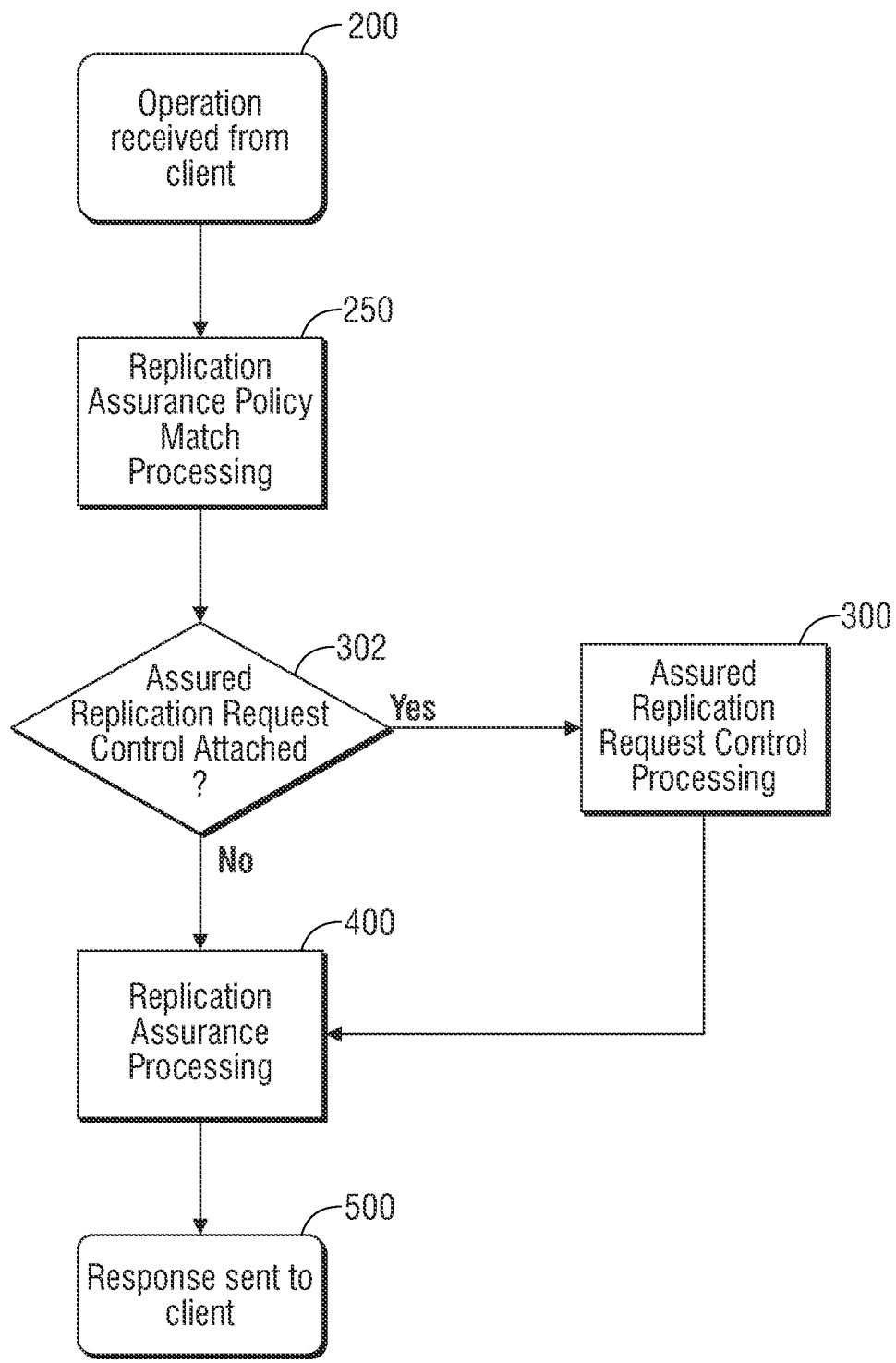
FIG. 2 is a flowchart showing an exemplary high-level operation replication assurance processing method.
Figure 3:
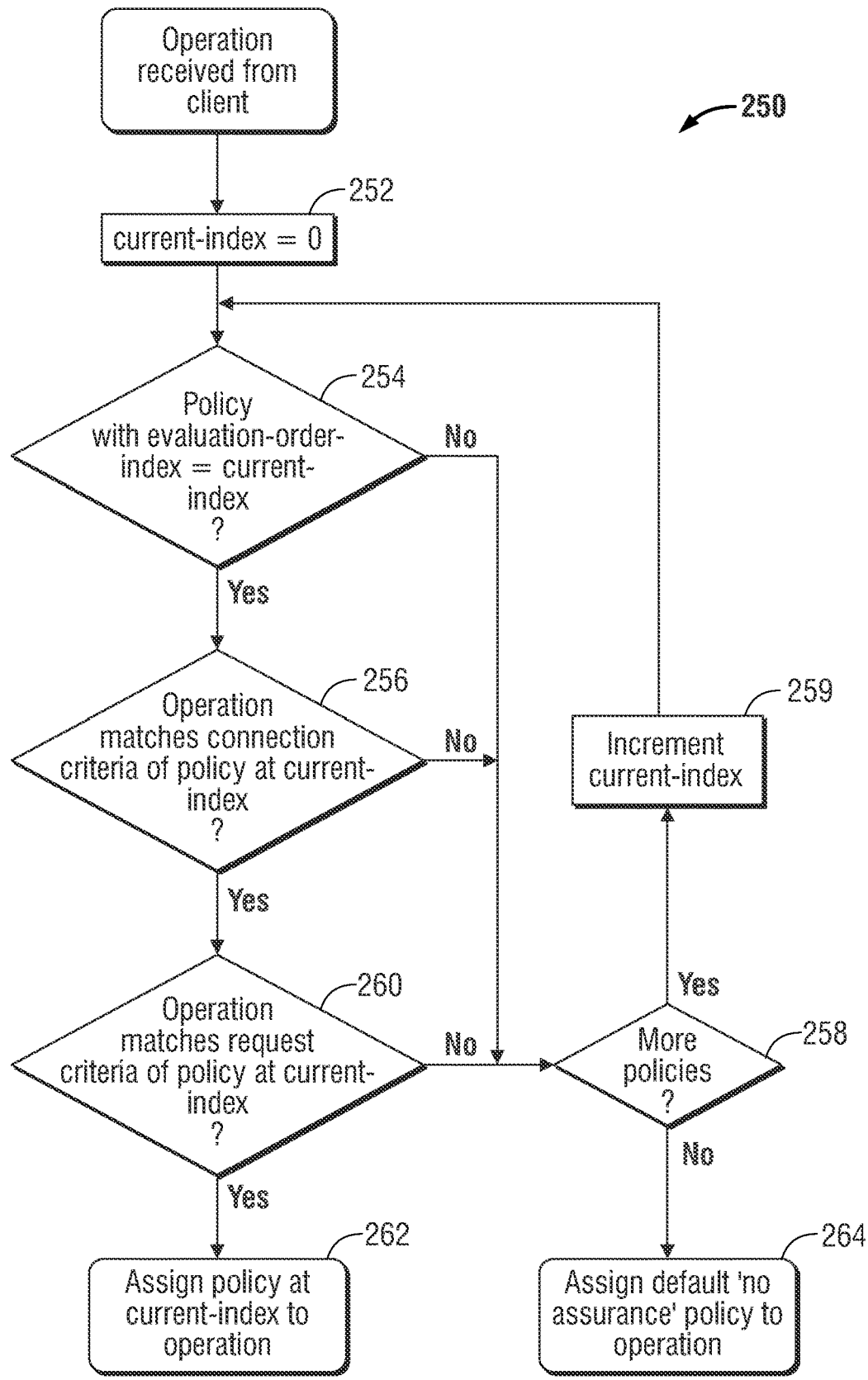
FIG. 3 is a flowchart showing an exemplary replication assurance policy match processing method.
Figure 4:
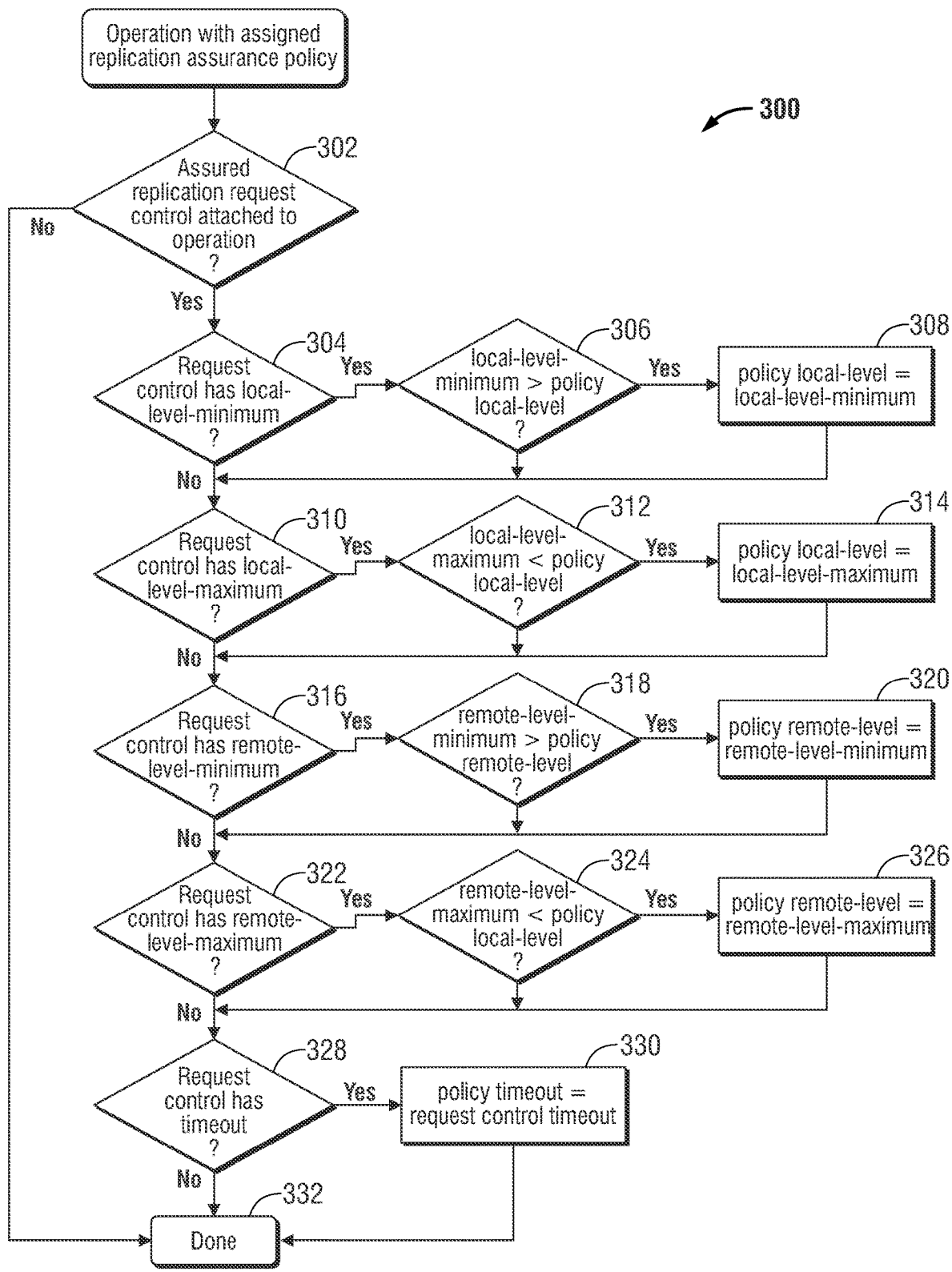
FIG. 4 is a flowchart showing an exemplary assured replication request control processing method.
Figure 5:
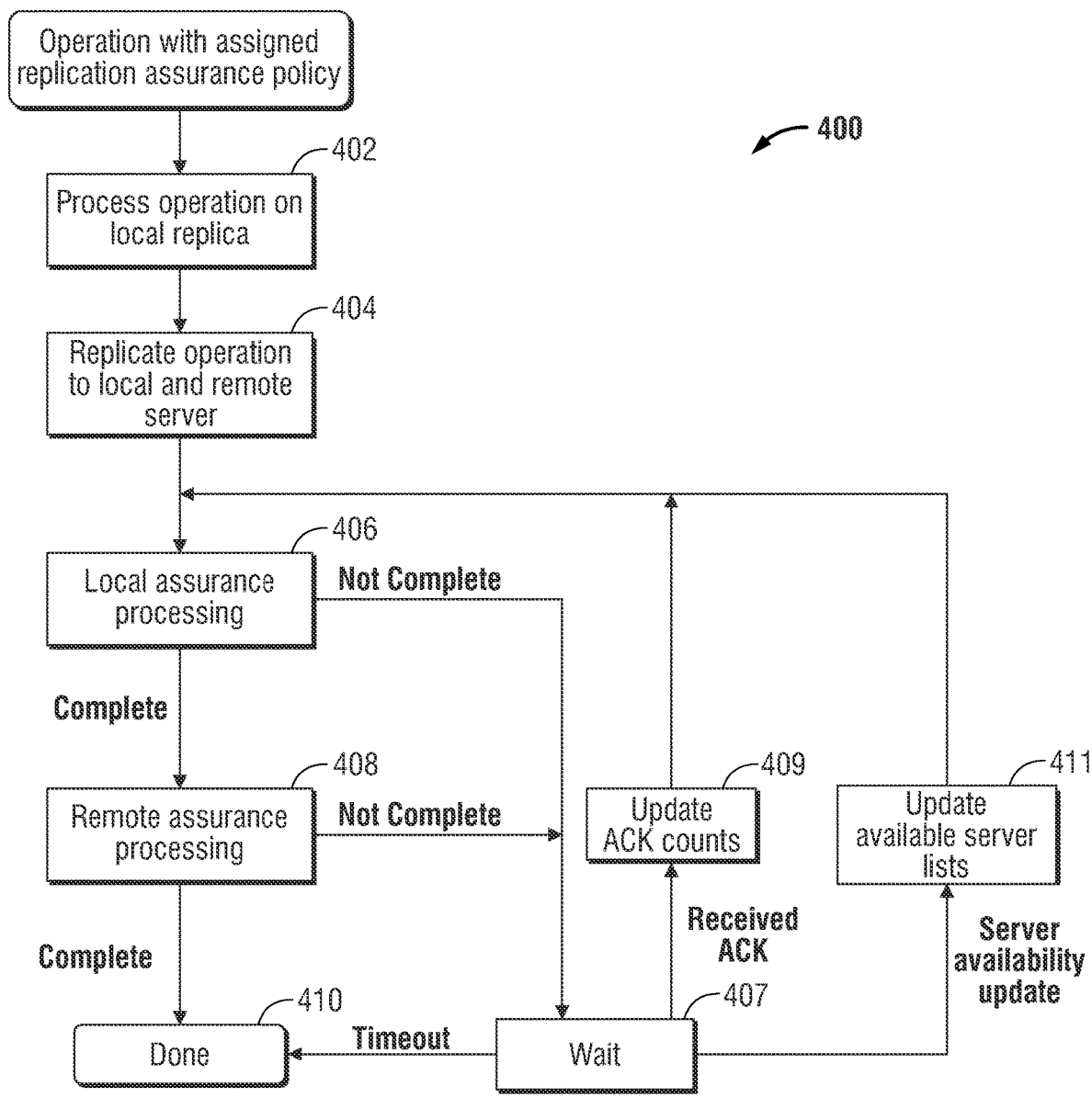
FIG. 5 is a flowchart showing an exemplary replication assurance processing method.
Figure 6:
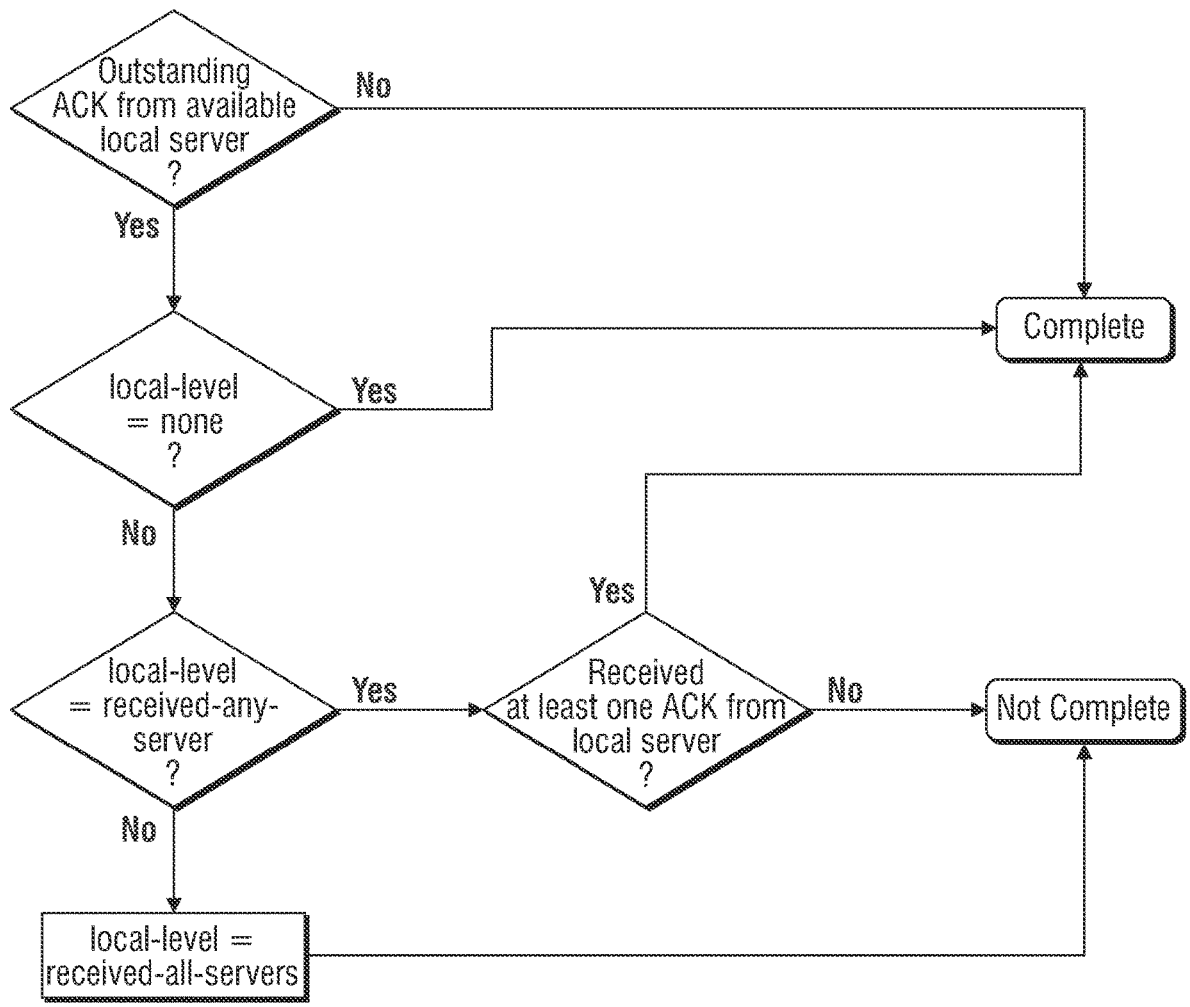
FIG. 6 is a flowchart showing an exemplary local replication assurance processing method.
Figure 7:
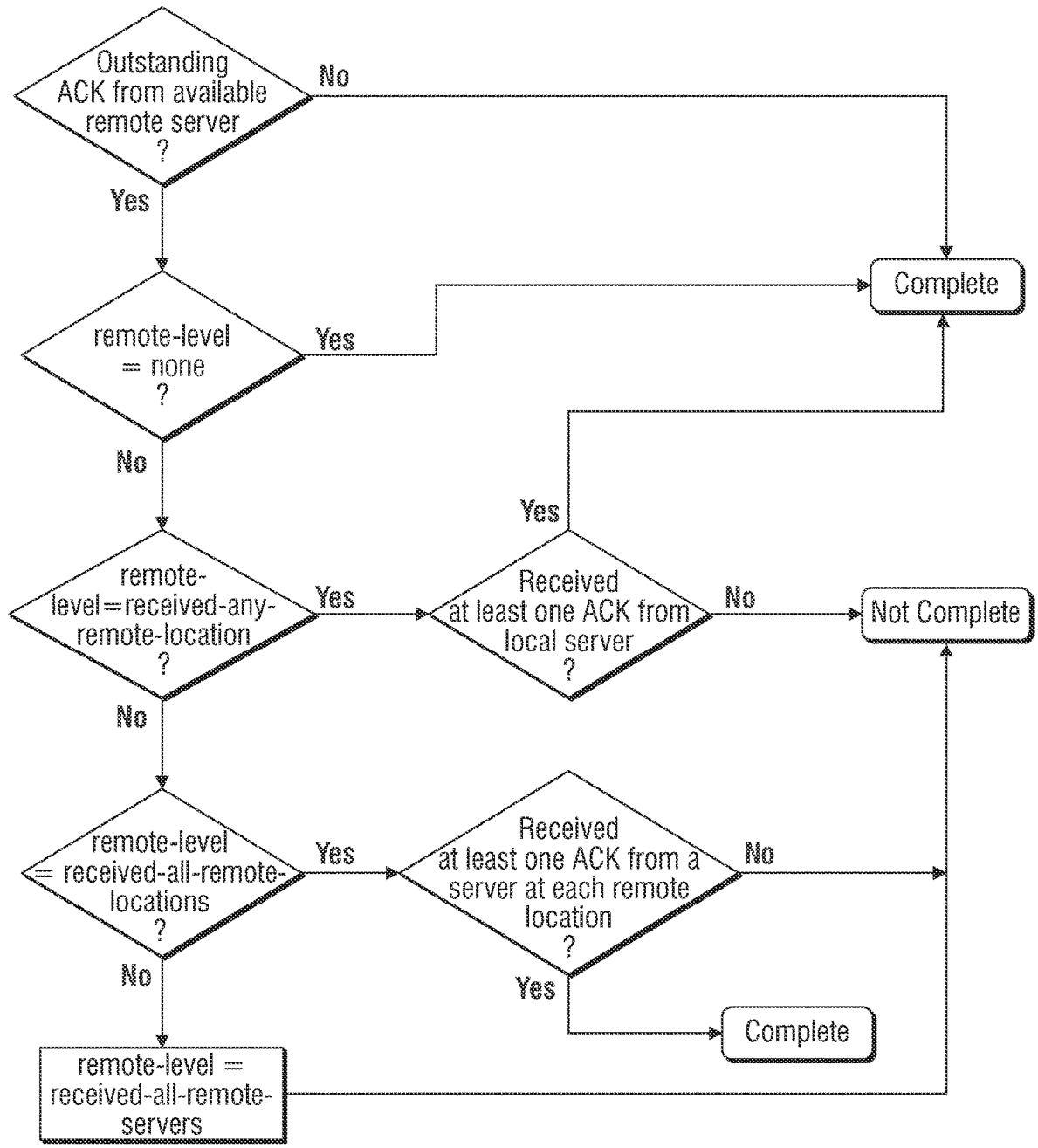
FIG. 7 is a flowchart showing an exemplary remote replication assurance processing method.

FIG. 2 is a flowchart showing an exemplary high-level flow of operation processing by the assured replication features disclosed in accordance with one or more embodiments herein. When an operation is received from a client 200, it is first matched against a replication assurance policy 250. This assigns the tentative assurance requirements for the operation. The details of replication assurance policy match processing 250 are shown in FIG. 3. After the operation is assigned a matching policy, if the operation has an assured replication request control attached 302, the assigned policy is updated based on the contents of the request control 300. After such, the assurance requirements of the operation have been finalized. The details of assured replication request control processing 300 are shown in FIG. 4. Once a policy is matched and updated with the results of request control processing, the operation is replicated to all servers and replication assurance processing 400 is performed. The details of replication assurance processing 400 are shown in FIGS. 5, 6, and 7. A response to the operation is sent back to the client once replication assurance processing completes 500.

Replication Assurance Policy Match Processing

FIG. 3 is a flowchart showing an exemplary replication assurance policy match processing method 250. Each operation is matched against and assigned exactly one replication assurance policy when it comes in from a client. The policies may be iterated over by the evaluation-order-index each is assigned 252, 258, 259, sequentially from 0 and up. For each index, if a policy has an evaluation-order-index equal to the current index an attempt is made to match the policy to the operation 254, 256, 260. If the policy has connection criteria defined and that criteria does not match the operation, the attempt fails and the next policy is attempted. If the policy does not define connection criteria or the criteria defined matches the operation, an attempt to match the policy's request criteria is performed.

If the policy has request criteria defined and that criteria does not match the operation, the attempt fails and the next policy is attempted. If the policy does not define request criteria or the criteria defined matches the operation, the policy is declared a match for the operation, the policy is assigned to the operation and match processing is complete 262. If all of the configured policies have been iterated over and none match the operation, an internal default policy of no assurance (i.e. local-level=none, remote-level=none) is assigned to the operation and match processing is complete 264.

Assured Replication Request Control Processing

FIG. 4 is a flowchart showing an exemplary assured replication request control processing method 300. If an operation has an assured replication request control attached, its assigned policy is updated based on the attached control 302. If the request control has a local-level-minimum defined and that level is greater than the local-level set for the operation, the local-level of the operation is changed to the local-level-minimum in the control 304, 306, 308. If the request control has a local-level-maximum defined and that level is less than the local-level set for the operation, the local-level of the operation is changed to the local-level-maximum in the control 310, 312, 314. If the request control has a remote-level-minimum defined and that level is greater than the remote-level set for the operation, the remote-level of the operation is changed to the remote-level-minimum in the control 316, 318, 320. If the request control has a remote-level-maximum defined and that level is less than the remote-level set for the operation, the remote-level of the operation is changed to the remote-level-maximum in the control 322, 324, 326. If the request control has a timeout defined, the timeout of the operation is changed to the timeout in the control 328, 330.

Replication Assurance Processing

FIG. 5 is a flowchart showing an exemplary replication assurance processing method 400. Once the operation is matched with a policy and that policy has been updated based on the request control (if one is attached), the assurance requirements for the operation have been finalized. The operation is processed in the local replica 402 and then replicated to all local and remote servers 404. After each server processes the replicated operation, it returns an acknowledgement (i.e., "ACK") message back to the originating server indicating that the operation has been successfully replicated.

The originating server initially checks if both local and remote assurance processing have completed, as shown in FIGS. 6 and 7. If both local and remote assurance processing complete, assurance processing is finished 410. If not, the originating server waits for either a timeout 407 (determined by the resulting assurance requirements computed earlier with the policy match and request control update) or for an event that may influence the outcome of the local or remote assurance processing. As the relevant events, namely receiving an ACK 409 from a server that processed the replicated operation and a server availability change 411 (e.g., a server goes down), the server re-checks if both local and remote assurance processing have completed. If both complete, assurance processing is finished 410. If not, the server loops again waiting to either timeout or for another relevant event to occur. If the server timeouts, assurance processing is finished.

Local Assurance Processing

The local assurance processing algorithm is shown in FIG. 6 in accordance with exemplary embodiments. In a previous step, a list of local available servers at the time an update is stored and referenced by the sent update. This is a list of local assurance sources for the operation. As ACKs come in from these sources, they are removed from this list. The first step in checking if local assurance is complete is to see if the list of local available servers is empty. If the list of local available servers is empty, it may mean there were never any available sources to replicate to, or ACKs from all of the local available servers were received, so assurance is complete. As used in this context for discussion purposes, 'complete' means checking for assurance is complete, but it does not imply that assurance completed successfully.

If there are still outstanding ACKs from available sources, a check for assurance completion based on the assigned local-level of the operation is performed. If the local-level is "none" then no assurance is required and processing is complete. If the local-level is "received-any-server" then assurance is complete if an ACK is received from at least one local server. Otherwise, the local-level must be "processed-all-servers" and so assurance is not completed because there is at least one outstanding ACK in the first step of processing.

Remote Assurance Processing

The remote assurance processing algorithm is shown in FIG. 7 in accordance with exemplary embodiments. Similar to local assurance processing, in a previous step, a list of remote available servers at the time an update is replicated is stored and referenced by the sent update. This is a list of remote assurance sources for the operation. As ACKs come in from these sources, they are removed from this list. The first step in checking if remote assurance is complete is to see if the list of remote available servers is empty. If so, it may mean there were never any available sources to replicate to, or ACKs from all of the remote available servers were received, so assurance is complete. As used in this context for discussion purposes, 'complete' means checking for assurance is complete, but it does not imply that assurance completed successfully.

If there are still outstanding ACKs from available sources, a check for assurance completion based on the assigned remote-level of the operation is performed. If the remote-level is "none" then no assurance is required and processing is complete. If the remote-level is "received-any-location" then assurance is complete if an ACK is received from at least one remote server. If the remote-level is "received-all-locations," then assurance is completed if an ACK is received from at least one server at each location. Otherwise, the remote-level must be "processed-all-remote-servers" and so assurance is not completed because there is at least one outstanding ACK in the first step of processing.

EXAMPLES

This section illustrates how these new features may be applied to real-world problems in accordance with one or more embodiments disclosed herein. Several types of operations from different sources are recognized and handled optimally. A replication assurance policy is defined in Table 1 below for each of the following cases, with an appropriate evaluation order index assigned to achieve the desired policy match. The connection and request criteria referenced by the replication assurance policies are defined in Table 2 below.

LDAP ADD, DELETE, and MODIFY DN operations have a remote policy of "processed all" to guarantee that all changes that affect the distinguished name (DN) of the entry are synchronously applied everywhere. This is to help a provisioning application because different stages of the provisioning could need to access an entry in different data centers. This is policy "dn-changes-processed-all-globally" in Table 1.

Update operations (i.e., LDAP ADD, DELETE, MODIFY, MODIFY DN) for example application 'A' (as identified by bind DN or IP address range) use a local level of "processed all" because it is known to immediately search back for an entry to verify the changes were applied successfully. This is policy "application-A-processed-all-locally" in Table 1.

Modifications to a specific attribute named "unused-minutes" represents the majority of the update traffic hitting the topology AND these attributes do not have special replication constraints, so local and remote levels of NONE are assigned so that the average response time of the server remains high. This is policy "unused-minutes-property-no-assurance" in Table 1.

Default policy of "received any" for local servers. This guarantees all of the changes other than the ones in 3 and 4 above will reach all other servers in the topology. This is policy "default-received-any-locally" in Table 1.

TABLE 1

EXAMPLE REPLICATION ASSURANCE POLICIES

| Policy Name | Evaluation Order Index | Connection Criteria | Request Criteria | Local Assurance Level | Remote Assurance Level |
|---|---|---|---|---|---|
| unused-minutes-property-no-assurance | 1 | N/A | Update targets unused-minutes only | none | none |
| application-A-processed-all-locally | 2 | Connection was established by application-A | N/A | processed-all-locally | none |
| dn-changes-processed-all-globally | 3 | N/A | Operation is an add, delete, or modify-dn operation | processed-all-servers | processed-all-remote-servers |
| default-received-any-locally | 9999 | N/A | N/A | received-any-server | none |

Table 2 lists some example incoming operations, some with attached assured replication request controls, which replication assurance policies are matched against them, and what assurance levels are applied as a result.

TABLE 2

EXAMPLE OPERATIONS

| Operation | Assured Replication Request Control | Matched Policy | Applied Local Assurance Level (* - altered by request control) | Applied Remote Assurance Level (* - altered by request control) | Notes |
|---|---|---|---|---|---|
| Application A modifies the "unused-minutes" attribute of an entry | None attached | unused-minutes-property-no-assurance | none | none | |
| Application A adds a new entry | None attached | dn-changes-processed-all-globally | processed-all-servers | processed-all-remote-servers | |
| Application A modifies the "last-name" property of an entry | None attached | application-A-processed-all-locally | processed-all-servers | none | |
| Application B adds a new entry | None attached | dn-changes-processed-all-globally | processed-all-servers | processed-all-remote-servers | |
| Application B modifies the "last name" property of an entry | None attached | default-received-any-locally | received-any-server | none | |
| Application B modifies "unused-minutes" attribute | local-level-minimum = received-any-server | unused-minutes-property-no-assurance | received-any-server* | none | Application B ensures there is at least one copy of its modification to "unused-minutes" before getting a response with a request control. |

TABLE 2-continued

EXAMPLE OPERATIONS

| Operation | Assured Replication Request Control | Matched Policy | Applied Local Assurance Level (* - altered by request control) | Applied Remote Assurance Level (* - altered by request control) | Notes |
|---|---|---|---|---|---|
| Nightly batch backup adding, deleting, and modifying entries | local-level-maximum = none, remote-level-maximum = none | dn-changes-processed-all-globally | none* | none* | The nightly backup is optimized for high throughput, at the expense of assured replication. It overrides all assurance levels setting them to "none" with the attached request control. |

Referring to FIG. 8, a sequence diagram of an exemplary operation having assured replication in accordance with one or more embodiments disclosed herein is shown. In this example, an 'Add' operation with a local level of "processed all" and a remote level of "received all remote locations" is performed. This example demonstrates the communication between directory server replicas when an operation comes into Directory Server Replica 1 that has a local assurance level of "Processed All" and a remote assurance level of "Received All Remote Locations." This policy ensures that when a result is returned to the client that all servers in the local data center have processed the operation and at least one other server in each remote location (e.g., Remote Location X and Remote Location Y) has received the change. This guarantees that the client will see a consistent view of the data if it queries any other server in the local data center and that the change will propagate to all servers in the topology even if there is a network failure between data centers.

In this example, Directory Server Replica 1 applies the change locally and then replicates it to all other servers in the topology. For servers in the local data center (Directory Servers Replicas 2 and 3), Directory Server Replica 1 asks servers in the local data center to send an ACK once they have processed the change. For servers in the remote data centers, Directory Server Replica 1 asks the remote data centers to send an ACK once the operation has been received.

All servers send the appropriate acknowledgements back to Directory Server Replica 1, but it is able to send the result back to the client once Directly Server Replica 4 and Directory Server Replica 6 have acknowledged receipt of the change since this guarantees that at least one server in each data center has received the change.

Configuring Assured Replication

Assured replication described in accordance with one or more embodiments herein is based on the eventual-consistency model, which is a loosely-connected topology that propagates updates to other servers without waiting for their corresponding replication response messages. As a result, there is a small window of time where updates are not all present on the replicas as the changes are replicating through the system. There are, however, deployments that require immediate access to replicated data. In such cases, administrators may configure assured replication, which ensures that replication has completed before the update response is returned to the client. The following example illustrates a procedure for configuring assured replication on one or more servers. The example procedure assumes three servers on localhost, on ports 1389, 2389, and 3389. Each server is configured having a default replication assurance policy with no assurance levels set.

In reference to FIG. 9, on server 1, dsconfig is used to set up a request criteria for Add operations. This request criteria will be used to match against any Add operation with the replication assurance policy that will be configured in the next step. Command 900 is run.

In reference to FIG. 10, on server 1, the replication assurance policy is set up to make all Add operations assured with a local level of processed-all-servers, which indicates that all local servers in the topology must complete replay of the replication update before the response is sent to the client. "Add" criteria configured in the previous step are specified. Command 1000 is run.

In reference to FIG. 11, on server 1, the previous two steps are repeated for Modify operations. The replication assurance policy "Mods Received Any Locally" ensures that at least one available local server must receive a replication modify update before a response is sent to the client. Command 1100 is run.

In reference to FIG. 12, on server 2, the previous three steps are repeated to set up the Adds and Mods request criteria and its respective replication assurance policy. Command 1200 is run.

Server 3 is left as is with the default replication assurance policy configured with no assurance levels or criteria.

In reference to FIG. 13, on server 1, policies on the server are listed using the dsconfig command to confirm that they exist on the server. This step is repeated on server 2 and server 3. Server 3 should only show the default replication assurance policy. Command 1300 is run.

In reference to FIG. 14, replication assurance counters are checked on all servers before any Add or Modify operation using ldapsearch. They should be set to zero. These counters are on the replica server, which is where the policy is matched and assigned. On server 2, command 1400 is run.

In reference to FIG. 15, the replication summary table on all of the servers is checked. For example, command 1500 is run on server 1.

In reference to FIG. 16, an entry to the directory server (e.g., an identity data store) is added. Counters are checked to make sure they match the newly added entry to the "Adds Processed All Locally" policy and that it completed assured. Command 1600 is run.

In reference to FIG. 17, modifications are made in some entries in the directory server or identity data store. Counters are checked to make sure they match the mod operations to the "Mods Processed All Locally" policy and that the operations completed assured. Command 1700 is run to successfully configure assured replication in accordance with one or more embodiments disclosed herein.

Significant advantages are provided by the methods, system and apparatus for a directory service that allows one or more replication assurance policies to be dynamically selected based on various criteria associated with an assured replication operation described herein. Applications that are not sensitive to replication consistency may be allowed to maintain very low response times to data requests while other applications may have a more consistent view of their change across the entire topology. Furthermore, an administrator may enforce a desired level of assurance across all applications for certain types of operations, modifications to specific attributes, or changes to specific types of entities. What's more, separate assurance replication policies may be maintained for local and remote data servers.

A common topology of a directory service employing the embodiments described herein might have 8 directory servers and 6 proxies, but it would not be unusual to find a topology with 40 directories and 20 proxies. A directory in an entry-balanced environment might contain 40 million entries partitioned into two entry balanced sets of 20 million entries apiece. Each 20M-partition database would be about 30 GB on disk and cached in memory. The topology of 8 directories and 6 proxies could handle 300,000 searches per second plus in an entry-balanced environment 20,000 updates per second. A proxy server in a commercial implementation could easily be responsible for maintaining a directory with 100 million entries and 15 different directory servers. Because of the complexity of the topology, the number of potential changes (>10K per second), the latency expected for each operation (<1 sec), as a practical matter, cannot be performed by hand and must be performed by a computer.

Figure 19:
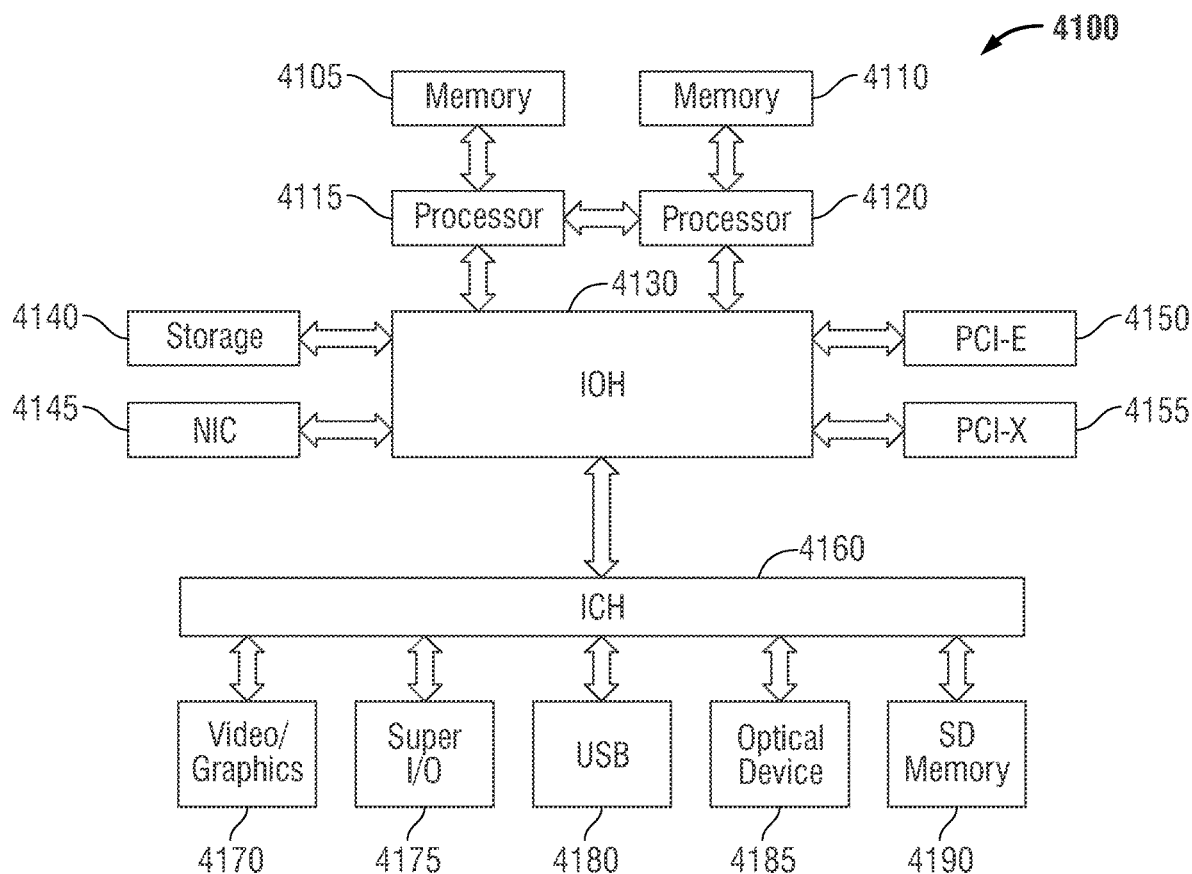
FIG. 19 is a top-level block diagram of hardware components of an exemplary computer.
Figure 20:
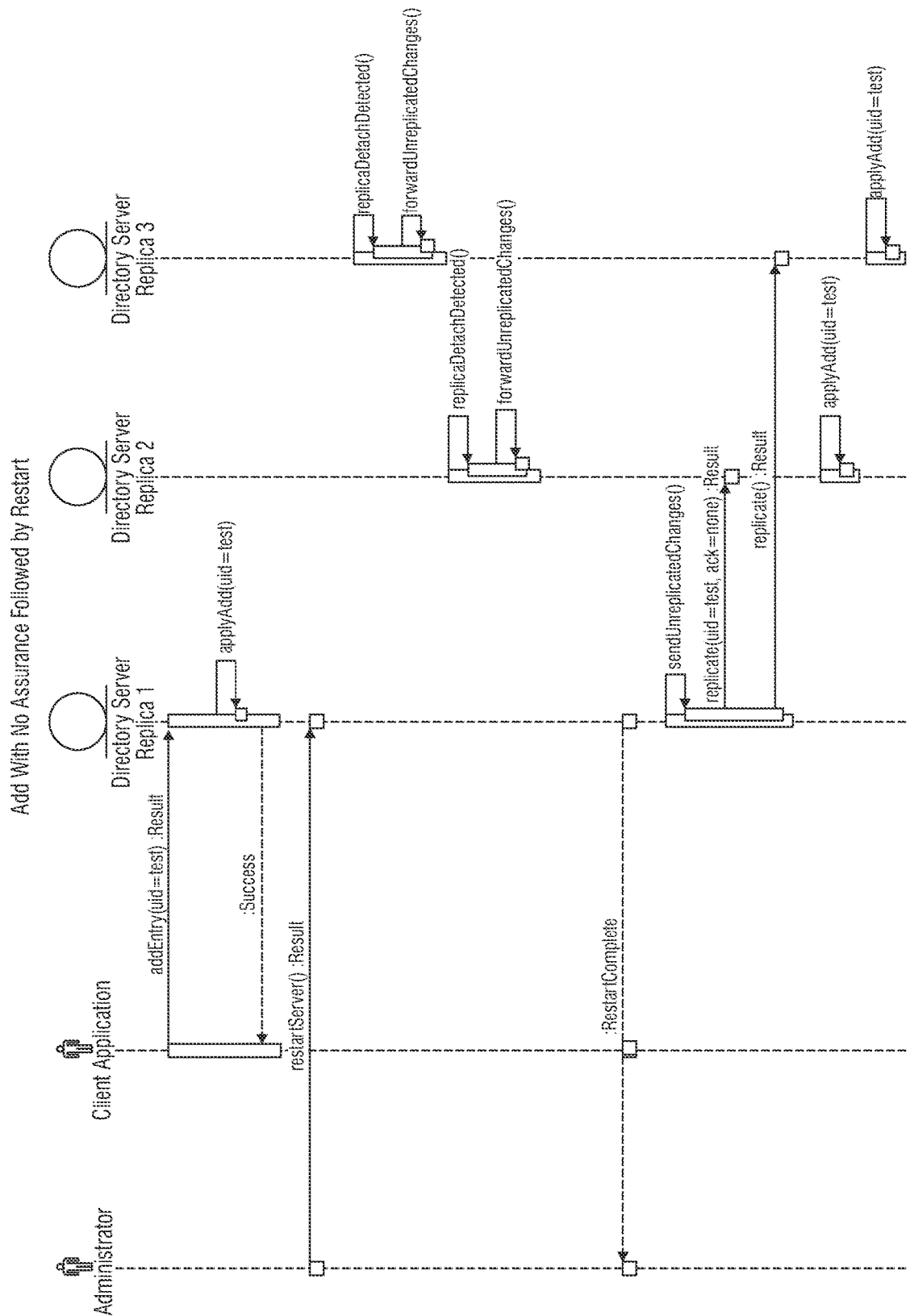
Figure 21:
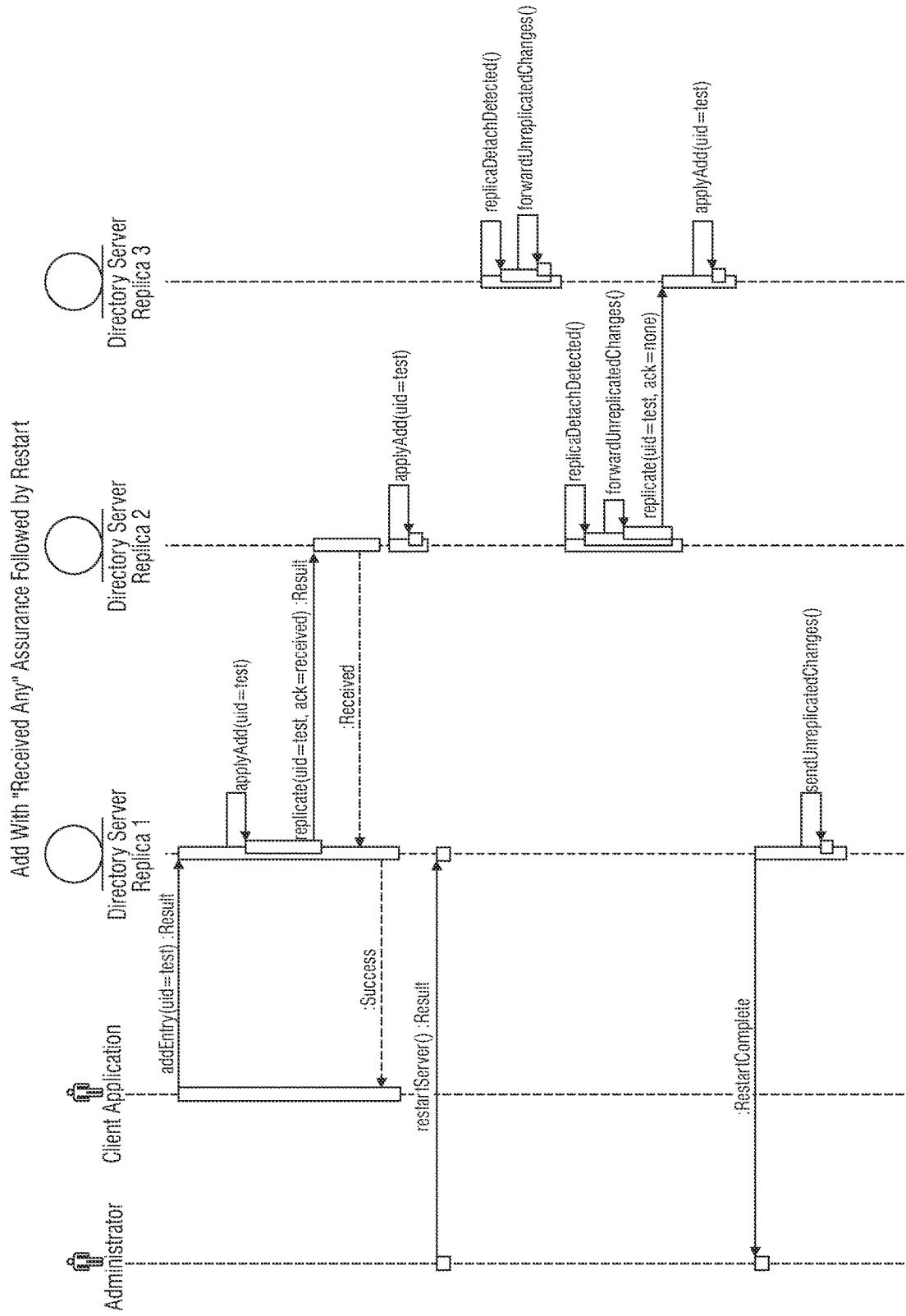
Figure 22:
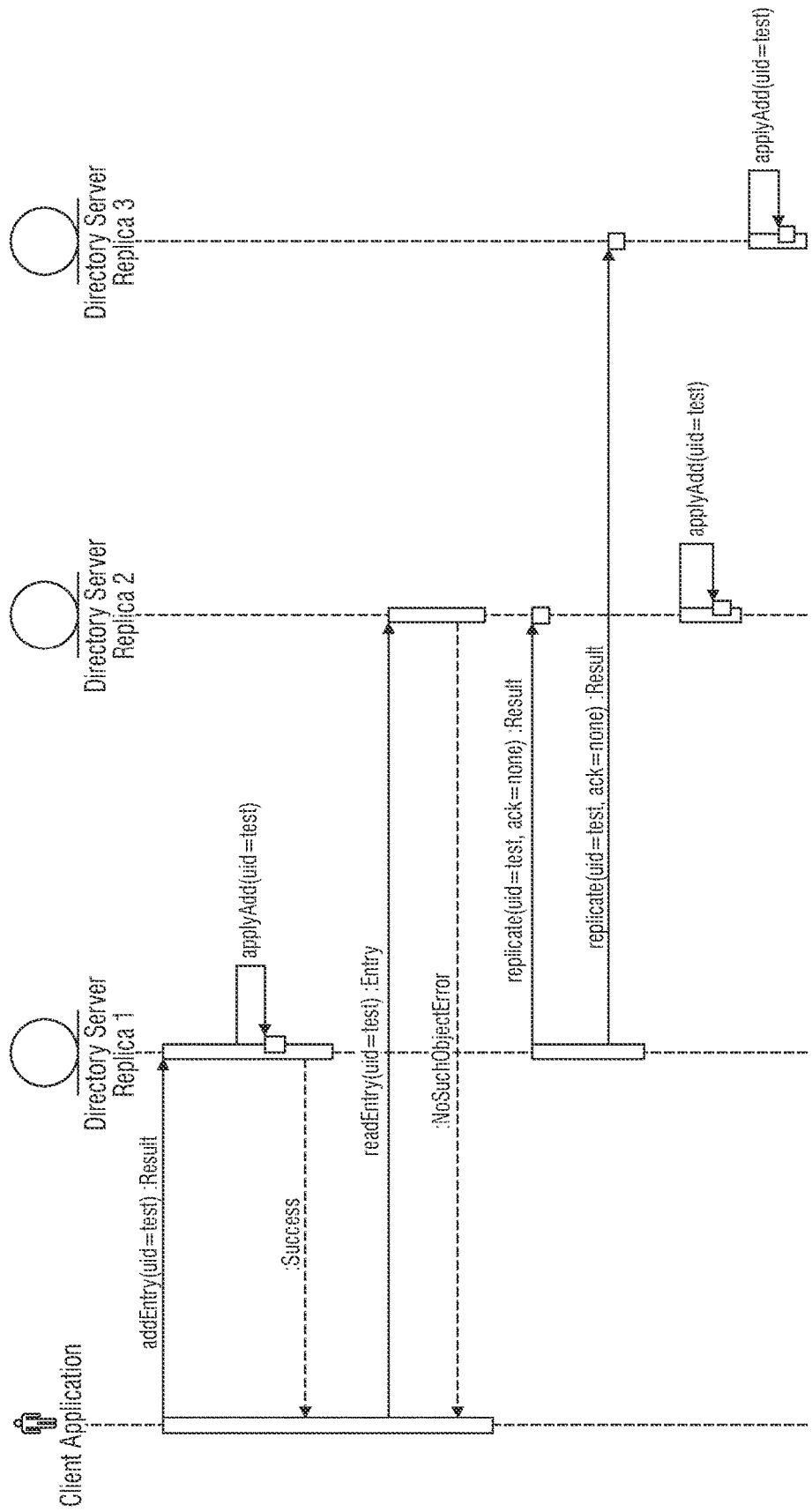
Figure 23:
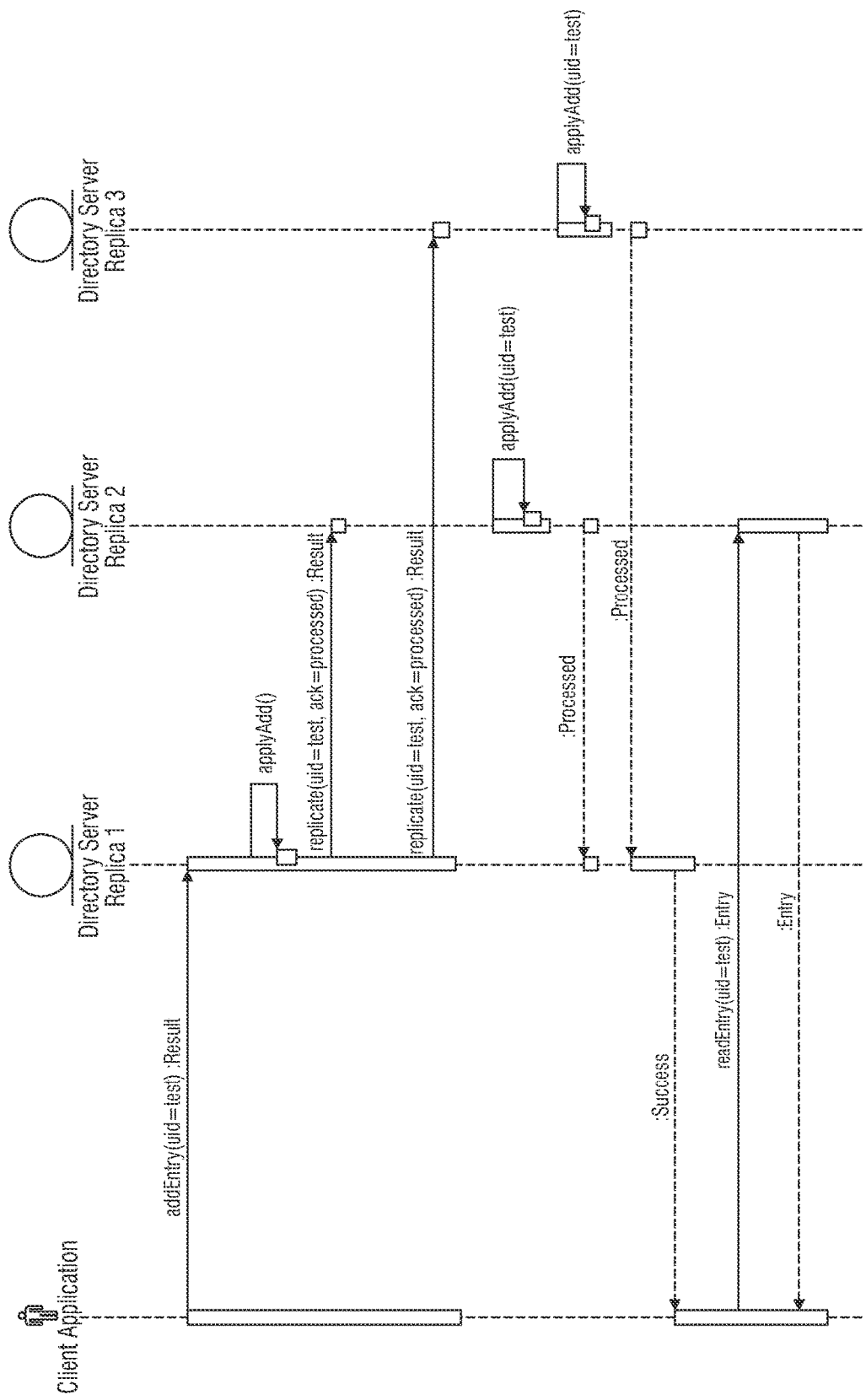
Figure 24:
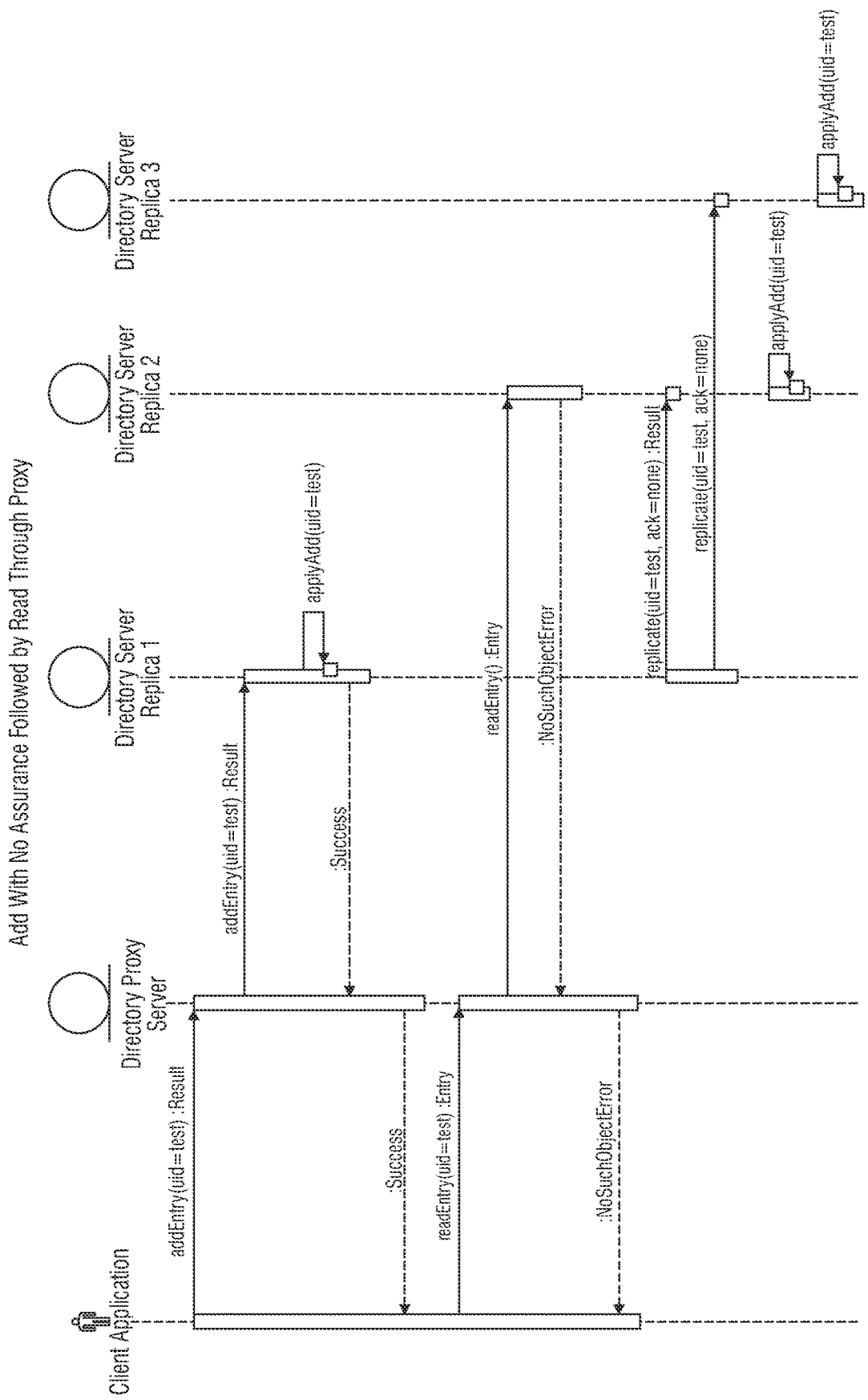

With reference to FIG. 19, this figure depicts a block diagram of exemplary components of a computer 4100 in which exemplary embodiments may be implemented. Computer 4100 is an example of a computer, such as a directory server 120, 124, 130, or 115, a proxy server 180, 182, 184, or a sync server 110, 112 in FIG. 1A, in which computer usable program code or instructions implementing the processes may be located for the illustrative embodiments.

In the depicted example, exemplary computer 4100 employs an architecture comprising one or more processing units 4115, 4120. Embodiments with more than one processing unit may include parallel processors. Processing units 4115, 4120 may contain one or more processors and/or multiple cores and may be implemented using one or more heterogeneous processor systems. Processors 4115, 4120 are coupled to memory 4105, 4110. Memory 4105, 4110 preferably comprises random access memory, including, preferably, a multiple-level memory cache hierarchy. Processors 4115, 4120 preferably are coupled to Input/Output Hub 4130. Input/Output Hub 4130 preferably is coupled to one or more peripheral busses, including PCI-E bus 4150 and PCI Express bus 4155. Input/Output Hub 4130 preferably is coupled to network interface controller 4145 for coupling for providing TCP/IP and ethernet connectivity. Input/Output Hub 4130 preferably is also coupled to one or more storage units 4140, including one or more hard disks, RAID arrays or Serial Attached SCSI (SAS) units. Input/Output Hub 4130 preferably is coupled to I/O Controller Hub 4160. I/O Controller Hub 4160 preferably is coupled to video/graphics chipset 4170, Super I/O (SIO) device 4175, Universal Serial Bus (USB) Controller 4180, optical drive 4185, and a slot for SD memory 4190. One or more components may be coupled to I/O Controller Hub 4160 via a PCI bus, an integrated drive electronics (IDE), or a serial advanced technology attachment (SATA) interface. Of course, the coupling between the components of computer 4100 may be implemented using any type of communications fabric or architecture that provides for a transfer of data between different components or devices attached to the fabric or architecture.

Generally, computer 4100 can be any computer embodied in hardware that provides sufficient computing power, memory, and persistent storage to perform the methods and processes and techniques of the embodiments described herein. An exemplary computer for use with embodiments of the invention is a Hewlett Packard Proliant® G6 server with dual cores and hyperthreading.

One of ordinary skill in the art will recognize that the methods, processes, and techniques of the embodiments described herein may be implemented to advantage in a variety of sequential orders and that the present invention may be generally implemented in a physical medium, preferably magnetic or optical media such as RAM, RAM drives, USB drives, SD memory, disks, tapes, DVDs and CD-ROMs or other storage media, for introduction into a directory service or distributed database system configured to replicate changes described herein. In such cases, the media will contain program instructions embedded in the media that, when executed by one or more processing units, will execute the steps and perform the methods, processes, and techniques described herein of replicating changes in a directory service or other distributed database system.

Figure 18:
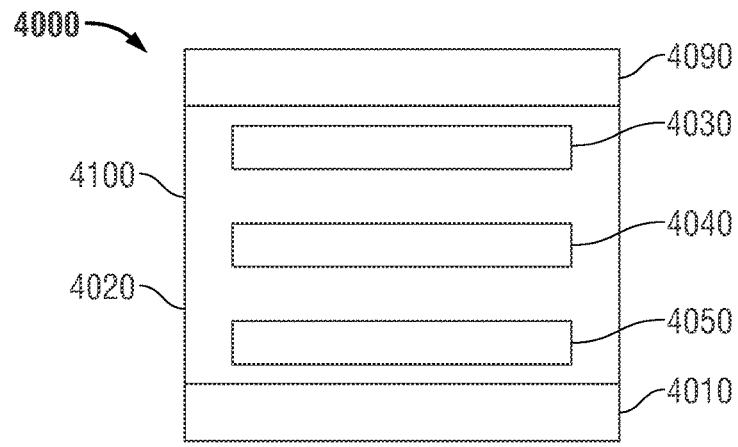
FIG. 18 is a top-level block diagram of software components of an exemplary computer.

FIG. 18 depicts exemplary software components 4000 of a computer 4100 (FIG. 19) in an exemplary embodiment. Memory 4090 in FIG. 18 preferably comprises memory 4105, 4110. An operating system 4010 runs on processing units 4115, 4120. The operating system 4010 coordinates and provides control of various components within computer 4100 in FIG. 19. Exemplary operating systems 4010 include commercially available operating systems such as Solaris® (Solaris is a trademark of Oracle America, Inc. in the United States and other countries) or Linux® (Linux is a trademark of Linus Torvalds in the United States and other countries). An object oriented programming system, such as the Java programming system, may be implemented in a Java Virtual Machine 4020 executing in conjunction with the operating system 4010 (Java is a trademark of Oracle America, Inc., in the United States and other countries). Software components 4090 in a computer used in an exemplary embodiment of a directory service may include zero or one or more directory servers 4030, zero or one or more proxy servers 4040, and zero or one or more sync servers 4050, each preferably implemented as a Java application and executed as an independent process in Java Virtual Machine 4020.

Data and instructions for the operating system 4010, the object oriented programming system, Java Virtual Machine 4020, and applications or programs are located on storage devices, such as HD/SAS units 4140, and may be loaded into main memory 4105, 4110 for execution by processing units 4115, 4120. Java Applications may contain instructions that are loaded into the portion of memory 4105, 4110 containing Java Virtual Machine 4020 and executed by Java Virtual Machine 4120. The processes of the illustrative embodiments may be performed by processing units 4115, 4120 using computer implemented instructions, which may be located in a memory, such as, for example, memory 4105, 4110, SD memory 4190, or in one or more peripheral devices.

The depicted examples in FIGS. 19 and 18 and above-described examples are not meant to imply architectural limitations. The hardware in FIG. 19 may vary depending on the implementation. Other internal hardware or peripheral devices, such as flash memory, equivalent non-volatile memory, and the like, may be used in addition to or in place of the hardware depicted in FIG. 19. In addition, the processes of the illustrative embodiments may be applied to a multiprocessor data processing system. In additional the processes of the illustrative embodiments may be encoded in a programming system other than Java, and may be executed under an operating system other than Linux or Solaris.

Although embodiments of the present invention has been described in detail, it will be apparent to those skilled in the art that many embodiments taking a variety of specific forms and reflecting changes, substitutions and alterations can be made without departing from the spirit and scope of the invention. The described embodiments illustrate the scope of the claims but do not restrict the scope of the claims.

We claim:

1. For use in a distributed database, a method of replicating changes to a dataset, the method comprising:
    receiving from a client a request for an operation on the dataset;
    selecting, in response to receiving the request, a replication assurance policy from a plurality of replication assurance policies for the operation, based on at least one of an operation criteria or a connection criteria, and to determine an assurance level, the assurance level being "processed all" or "received any";
    performing the operation on the dataset and not sending a result of the operation to the client before an acknowledgment is received from a replica of the dataset that the assurance level is met;
    submitting a command including the operation and the assurance level to the replica of the dataset,
    receiving the acknowledgement from the replica that the assurance level is met; and
    returning to the client the result of the operation in response to receiving the acknowledgement from the replica that the assurance level is met.

2. The method of replicating changes to a dataset of claim 1, wherein the operation criteria includes one or more of the following: operation type, type of entry, a portion of the dataset affected by the operation, or attributes included in the operation.

3. The method of replicating changes to a dataset of claim 1, wherein the connection criteria includes at least one of the following: server port on which the client request is received, an identity associated with the client, client membership in a specified group, client attribute, or client location.

4. The method of replicating changes to a dataset of claim 1, wherein the plurality of replication assurance policies are ordered.

5. The method of replicating changes to a dataset of claim 1, wherein the request for an operation on the dataset further includes a control to override the replication assurance policy.

6. The method of replicating changes to a dataset of claim 1, wherein the replica is a first replica, the method further comprising submitting the command including the operation to a second replica of the dataset.

7. The method of replicating changes to a dataset of claim 6, wherein success is reported to the client when the first replica and the second replica have completed the operation.

8. The method of replicating changes to a dataset of claim 6, wherein success is reported to the client when the command has been submitted to at least one of the first replica or the second replica.

9. The method of replicating changes to a dataset of claim 1, wherein the replica is a first replica and the assurance level is a first assurance level selected for the first replica, the method further comprising selecting a second assurance level for a second replica.

10. The method of replicating changes to a dataset of claim 9, wherein the second replica is remote from the first replica.

11. The method of replicating changes to a dataset of claim 9, wherein the first assurance level is different from the second assurance level.

12. The method of replicating changes to a dataset of claim 1, wherein the distributed database includes a directory service.

13. The method of replicating changes to a dataset of claim 1, wherein the distributed database includes an LDAP directory.

14. The method of replicating changes to a dataset of claim 1, further comprising updating the replication assurance policy to comply with a request control.

15. The method of replicating changes to a dataset of claim 14, further comprising submitting a command including the operation and an updated assurance level associated with the updated replication assurance policy to the replica.

16. A server for use in a distributed database system including a plurality of replicas of a dataset, the server comprising:
    one or more processing units;
    memory media coupled to the one or more processing units;
    instructions which when loaded into the memory media and executed by the one or more processing units cause the server to perform:
        receiving from a client a request for an operation on the dataset;
        selecting, in response to receiving the request, a replication assurance policy from a plurality of replication assurance policies for the operation, based on at least one of an operation criteria or a connection criteria, and to determine an assurance level, the assurance level being "processed all" or "received any";
        performing the operation on the dataset and delaying sending a result of the operation to the client until receiving an acknowledgment that the assurance level is met;
        submitting a command including the operation and the assurance level to a replica from the plurality of replicas of the dataset,
        receiving the acknowledgement from the replica that the assurance level is met; and
        returning to the client the result of the operation in response to receiving the acknowledgement from the replica that the assurance level is met.

17. The server of claim 16, wherein the request for an operation on the dataset includes a control that overrides the replication assurance policy.

18. The server of claim 16, wherein the replica is a first replica and the assurance level is a first assurance level selected for the first replica, the method further comprising selecting a second assurance level for a second replica.

19. The server of claim 18 wherein the second replica is remote from the first replica.

20. The server of claim 18, wherein the first assurance level is different from the second assurance level.

21. The server of claim 16, wherein the distributed database system comprises a directory service.

22. The server of claim 16, wherein the distributed database system comprises an LDAP directory.

23. The server of claim 16, further comprising instructions which when loaded into the memory media and executed by the one or more processing units cause the server to perform overriding the replication assurance policy to comply with a request control.

24. A distributed database system, comprising:
a dataset;
a first server, the first server hosting a first replica of the dataset, wherein the first server includes:
one or more processing units;
memory media coupled to the one or more processing units;
instructions which when loaded into the memory media and executed by the one or more processing units cause the first server to perform:
receiving from a client a request for an operation on the dataset;
selecting, in response to receiving the request, a replication assurance policy from a plurality of replication assurance policies for the operation, based on at least one of an operation criteria or a connection criteria, and to determine an assurance level, the assurance level being "processed all" or "received any";
performing the operation on the dataset and delaying sending a result of the operation to the client until an acknowledgement that the assurance level is met is received;
submitting a command including the operation and the assurance level to the first replica of the dataset,
receiving an acknowledgement from the first replica that the assurance level is met; and
returning to the client the result of the operation when the acknowledgement is received from the first replica that the assurance level is met; and
a second server, the second server hosting a second replica of the dataset.

25. The distributed database system of claim 24, wherein the distributed database system includes an LDAP directory service.

26. The distributed database system of claim 24, further comprising an LDAP directory.

27. The distributed database system of claim 24, wherein the replication assurance policy is a first replication assurance policy from the plurality of replication assurance policies, the assurance level is a first assurance level, the acknowledgement is a first acknowledgment, the command is a first command, the instructions when executed by the one or more processing units causing the first server to perform:
dynamically selecting a second replication assurance policy from the plurality of replication assurance policies and for the operation, the second replication assurance policy determining a second assurance level;
submitting, to the second replica of the dataset, a second command including the operation; and
reporting to the client the result of the operation when a second acknowledgement is received from the second replica that the second assurance level is met.

28. The distributed database system of claim 24, wherein the second replica is remote from the first replica.

29. The distributed database system of claim 27, wherein the first assurance level is different from the second assurance level.

30. The distributed database system of claim 24, wherein the first server further comprises instructions which when loaded into the memory media and executed by the one or more processing units cause the first server to perform overriding the replication assurance policy to comply with a request control.

31. For use in a distributed database, a method of replicating changes to a dataset, the method comprising:
receiving from a client a request for an operation on the dataset;
selecting a replication assurance policy from a plurality of replication assurance policies for the operation and based on one or more criteria;
performing the operation on the dataset to update the database and delaying sending a result of the operation to the client until receiving an acknowledgment that an assurance level is met, the assurance level being "processed all" or "received any";
submitting a command including the operation and the assurance level to a replica of the dataset, the assurance level being associated with the selected replication assurance policy,
receiving the acknowledgement from the replica that the assurance level is met; and
returning to the client the result of the operation when the acknowledgement is received from the replica that the assurance level determined by the selected replication assurance policy is met.

32. The method of replicating changes to a dataset of claim 1, further comprising:
before the selecting the replication assurance policy and in response to receiving the request, determining, based on the operation criteria or the connection criteria, if any replication assurance policy from the plurality of replication assurance policies applies to the operation,
the selecting the replication assurance policy including selecting the replication assurance policy in response to the determining.

33. The method of replicating changes to a dataset of claim 1, further comprising:
in response to the receiving the request, determining if any replication assurance policy from the plurality of replication assurance polices applies to the operation based on at least one of the operation criteria or the connection criteria,
the performing the operation on the dataset being based on the determining resulting in at least one replication assurance policy from the plurality of replication assurance policies applying to the operation.

* * * * *